(12) United States Patent
Higuchi et al.

(10) Patent No.: US 8,364,868 B2
(45) Date of Patent: Jan. 29, 2013

(54) DEVICE CONTROL APPARATUS, DEVICE CONTROL METHOD AND PROGRAM FOR INITIATING CONTROL OF AN OPERATION OF AN EXTERNAL DEVICE

(75) Inventors: Satoshi Higuchi, Kanagawa (JP); Koichi Tashiro, Tokyo (JP); Ken Onogi, Tokyo (JP)

(73) Assignee: Sony Corporation (JP)

( * ) Notice: Subject to any disclaimer, the term of this patent is extended or adjusted under 35 U.S.C. 154(b) by 107 days.

(21) Appl. No.: 12/979,953

(22) Filed: Dec. 28, 2010

(65) Prior Publication Data

US 2011/0164181 A1 Jul. 7, 2011

(30) Foreign Application Priority Data

Jan. 4, 2010 (JP) .................. P2010-000249

(51) Int. Cl.
*G06F 13/12* (2006.01)
(52) U.S. Cl. .......................... 710/62; 710/72
(58) Field of Classification Search ............ 710/62, 710/72
See application file for complete search history.

(56) References Cited

U.S. PATENT DOCUMENTS

| | | | |
|---|---|---|---|
| 2003/0217369 A1* | 11/2003 | Heredia | 725/152 |
| 2009/0106444 A1* | 4/2009 | Agnihotri et al. | 709/233 |
| 2009/0147137 A1* | 6/2009 | Bae et al. | 348/554 |
| 2009/0174821 A1* | 7/2009 | Matsuo et al. | 348/725 |
| 2010/0154020 A1* | 6/2010 | Okamoto et al. | 725/115 |

FOREIGN PATENT DOCUMENTS

WO 2008-093780 A1 8/2008

* cited by examiner

*Primary Examiner* — Chun-Kuan Lee
*Assistant Examiner* — David Martinez
(74) *Attorney, Agent, or Firm* — Lerner, David, Littenberg, Krumholz & Mentlik, LLP

(57) ABSTRACT

There is provided a device control apparatus, a device control method and a program capable of easily initiating control of an operation of an external device through an application according to a status of the external device and a usage status of the application. An application for controlling an operation of an AV amplifier is acquired from an application server, a status of the AV amplifier and a usage status of the application are determined upon startup of the application, a screen according to the result of the determination is displayed in order to arrange an operation environment of the application and then a manipulation screen for controlling the operation of the AV amplifier through the application is displayed, and the operation of the AV amplifier is controlled according to a user manipulation performed through the manipulation screen.

8 Claims, 20 Drawing Sheets

FIG. 2

Logical address

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

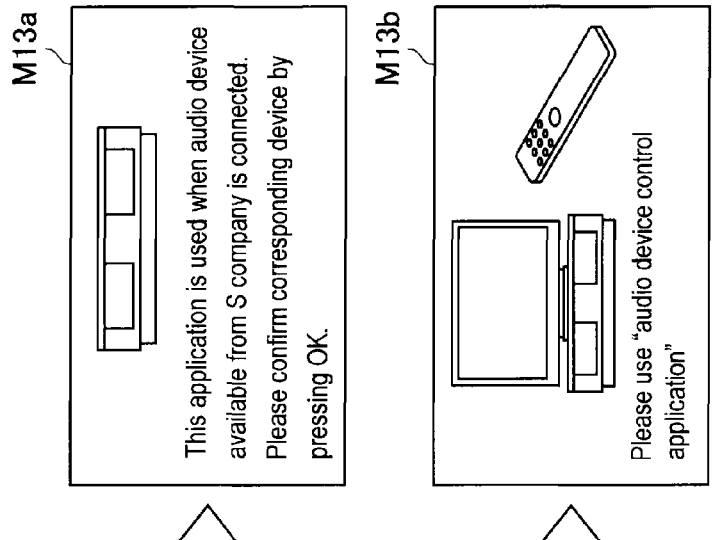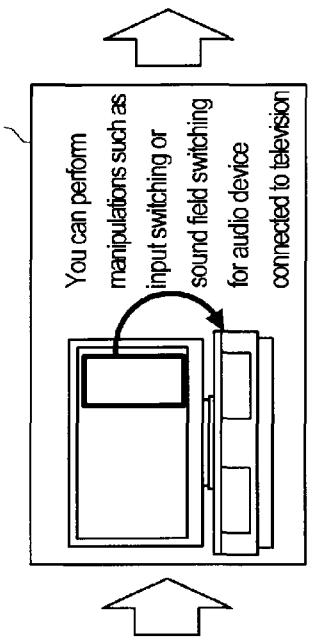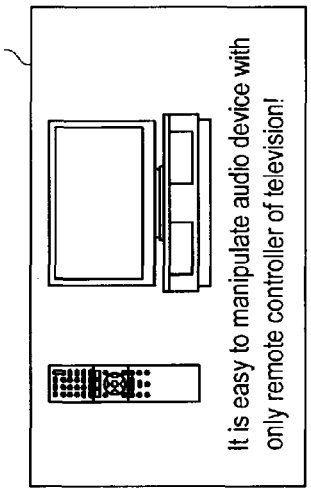

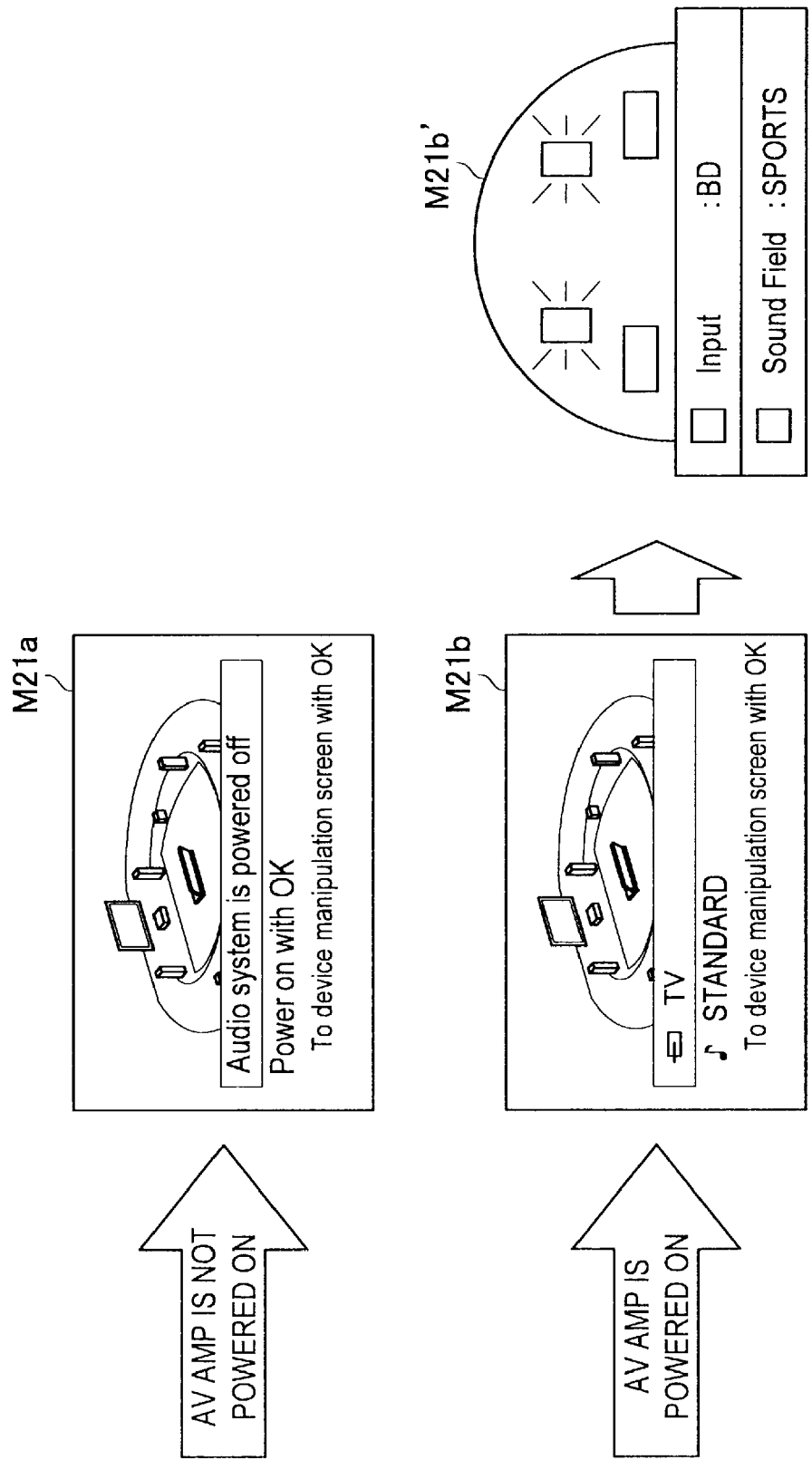

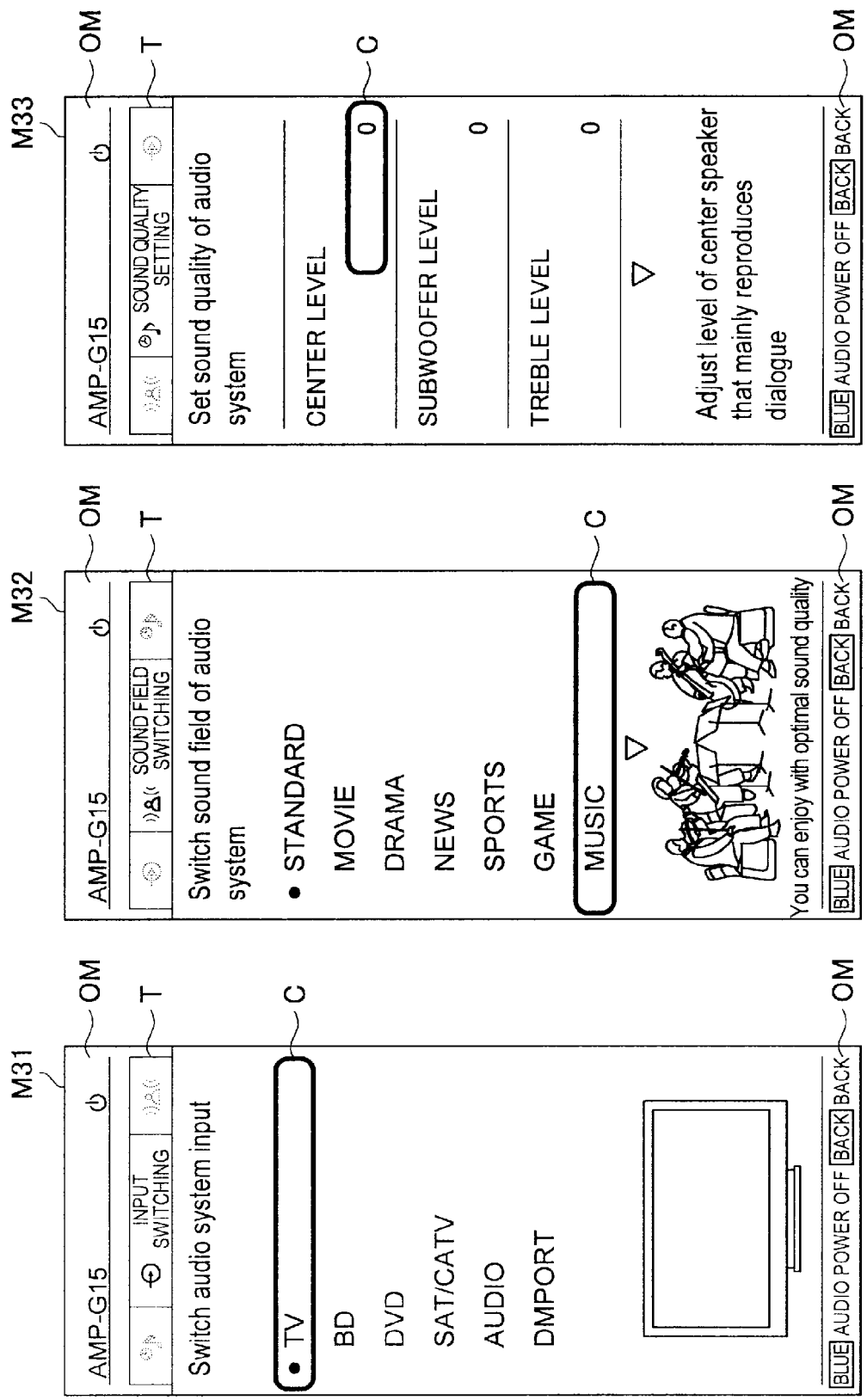

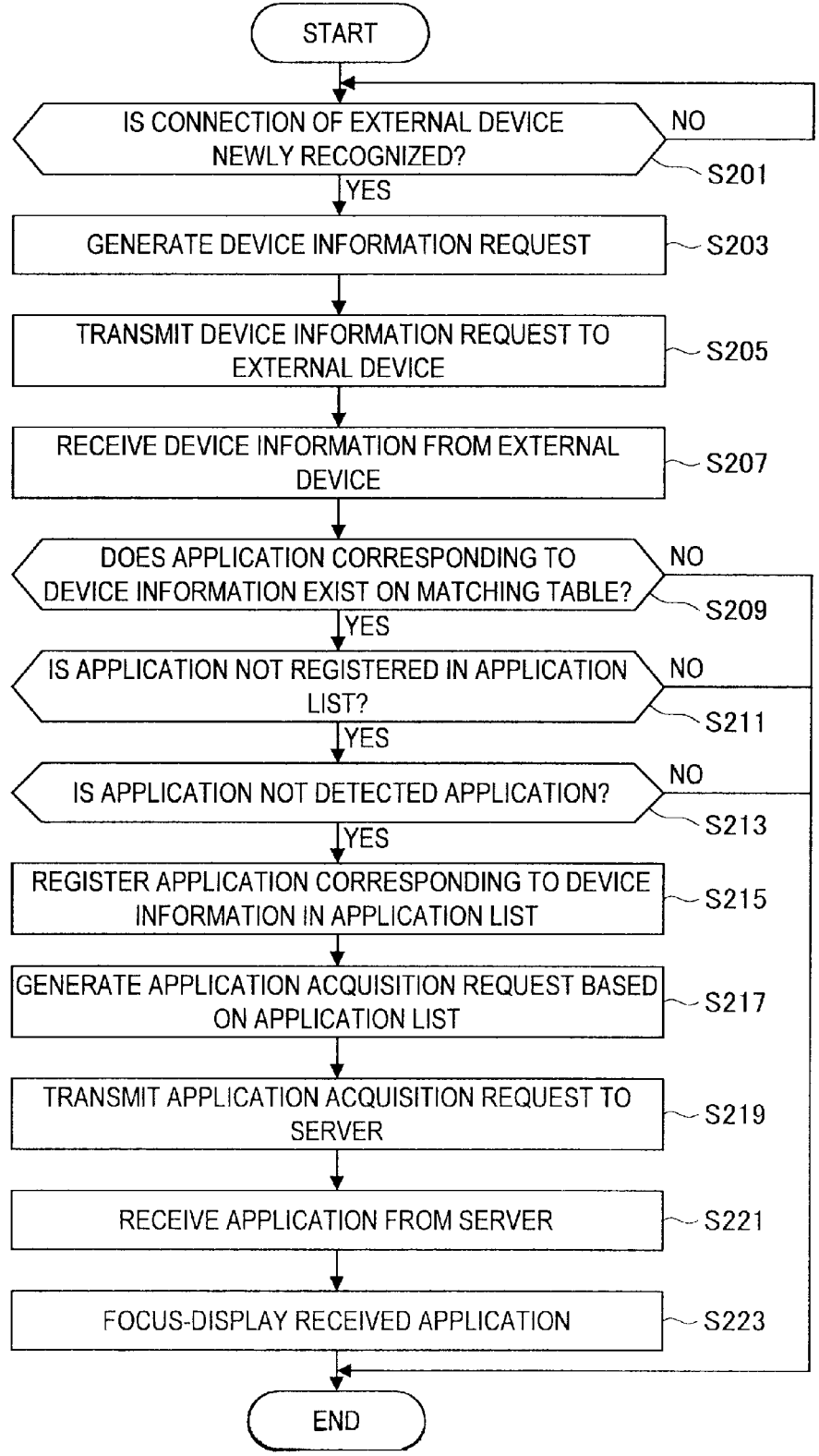

DEVICE CONTROL APPARATUS, DEVICE CONTROL METHOD AND PROGRAM FOR INITIATING CONTROL OF AN OPERATION OF AN EXTERNAL DEVICE

CROSS-REFERENCE TO RELATED APPLICATIONS

The present application claims the benefit of Japanese Priority Patent Application No. P2010-000249, filed Jan. 4, 2010 in the Japanese Patent Office, the disclosure of which is hereby incorporated herein by reference.

BACKGROUND OF THE INVENTION

1. Field of the Invention

The present invention relates to a device control apparatus, a device control method and a program.

2. Description of the Related Art

A television receiver that acquires various applications from an application server and executes the applications on the television receiver is known (e.g., International Publication No. 2008/093780). Here, the television receiver often constitutes an audio visual (AV) system together with an external device, such as an AV amplifier, connected to the television receiver. In this system, manipulations for controlling the television receiver and the external device are often not sufficiently systematized. In this case, a user performs the manipulation for controlling the system using both of a remote control of the television receiver and a remote control of the external device, resulting in cumbersome manipulation.

SUMMARY OF THE INVENTION

For this reason, for example, the applicant is developing a system capable of sufficiently systematizing a manipulation of the system by acquiring an application for controlling an external device from an application server and executing the application on a television receiver. In this system, when the application acquired from the application server is started up with a manipulation by a user, control of the external device through the application using a remote control of the television receiver becomes possible.

However, the user often tries to initiate the control of the external device through the application without arranging an application operation environment in advance. In particular, since the application is acquired from the application server, the user tends to easily initiate the control of the external device. In this case, the user may not initiate the control until the user arranges the application operation environment through, for example, a setting of the status of the external device. In particular, it is cumbersome for the user to set the status in an initial use of the application, but it is not cumbersome in second and subsequent uses since the operation environment has already been arranged.

It is desirable to provide a device control apparatus, a device control method and a program capable of easily initiating control of an operation of an external device through an application according to a status of the external device and a usage status of the application.

According to an embodiment of the present invention, there is provided a device control apparatus including an application acquisition unit for acquiring an application for controlling an operation of an external device from an application server, a display unit for displaying video information and a processing result based on the application, a signal input/output unit for receiving a signal indicating a status of the external device and outputting a signal for controlling the external device, a determination unit for determining the status of the external device and a usage status of the application upon startup of the application, a display control unit for controlling the display unit to display a screen according to the result of the determination in order to arrange an operation environment of the application, and then display a manipulation screen for controlling the operation of the external device through the application, and an operation control unit for controlling the operation of the external device according to the user manipulation performed through the manipulation screen.

According to such a configuration, the status of the external device and the usage status of the application are determined upon startup of the application, a screen according to the determination result is displayed in order to arrange an application operation environment, and then a manipulation screen for performing the control of the operation of the external device through the application is displayed. Accordingly, a user arranges the application operation environment according to the screen displayed according to the determination result, and then performs user manipulation through the manipulation screen, thus easily initiating the control of the operation of the external device through the application.

The device control apparatus may further include an acquisition request generating unit for generating an application acquisition request including device information of the external device when the external device is newly connected. The application acquisition unit may provide the application acquisition request to the application server, and automatically acquire the application for controlling the operation of the external device from the application server, the application being selected based on the device information by the application server.

The determination unit may be capable of executing a connection determination to determine whether the external device corresponding to the application has been connected, an execution determination to determine whether a given process of displaying the manipulation screen has already been executed, and a power-on determination to determine whether the external device has been powered on. The display control unit may control the display unit to display a screen urging a user to connect the external device corresponding to the application when it is determined in the connection determination that the external device corresponding to the application has not been connected, a screen for executing the given process when it is determined in the execution determination after the connection determination that the given process has not been executed, a screen for powering the external device on when it is determined in the power-on determination after the execution determination that the external device has not been powered on, and the manipulation screen when the external device has been powered on.

The display control unit may control the display unit to display a list of external devices corresponding to the application when it is determined in the connection determination that the external device corresponding to the application has not been connected.

The display control unit may control the display unit to display a screen for displaying the manipulation screen when it is determined in the execution determination after the connection determination that the application is registered in the apparatus and then the manipulation screen has not been displayed.

The operation control unit may output a signal for powering the external device on via the signal input/output unit when the screen for powering the external device on is displayed and then the given manipulation by a user is performed. The display control unit may control the display unit to display the manipulation screen after the external device is powered on.

The application acquisition unit may automatically acquire, from the application server, an application for excluding a deleted application deleted based on a manipulation by the user after the application is registered in the apparatus.

According to another embodiment of the present invention, there is provided a device control method comprising acquiring an application for controlling an operation of an external device from an application server, determining a status of the external device and a usage status of the application upon startup of the application, displaying a screen according to the result of the determination in order to arrange an operation environment of the application, and then displaying a manipulation screen for controlling the operation of the external device through the application, and controlling the operation of the external device according to the user manipulation performed through the manipulation screen.

According to another embodiment of the present invention, there is provided a program for causing a computer to execute the device control method. Here, the program may be provided by using a computer-readable recording medium and may be provided via communication means.

As described above, according to the present invention, it is possible to provide a device control apparatus, a device control method and a program capable of easily initiating control of an operation of an external device through an application according to a status of the external device and a usage status of the application.

BRIEF DESCRIPTION OF THE DRAWINGS

FIG. 2 shows a CEC table indicating a correspondence relationship between devices and CEC logical addresses;

FIG. 12 shows a screen displayed according to the results of the connection determination and the execution determination;

FIG. 13 shows a screen displayed according to the result of a power-on determination;

FIG. 14 shows a manipulation screen displayed in the active mode;

FIG. 20 is a flowchart showing a procedure of the automatic application acquisition process.

DETAILED DESCRIPTION OF THE EMBODIMENT(S)

Figure 1:
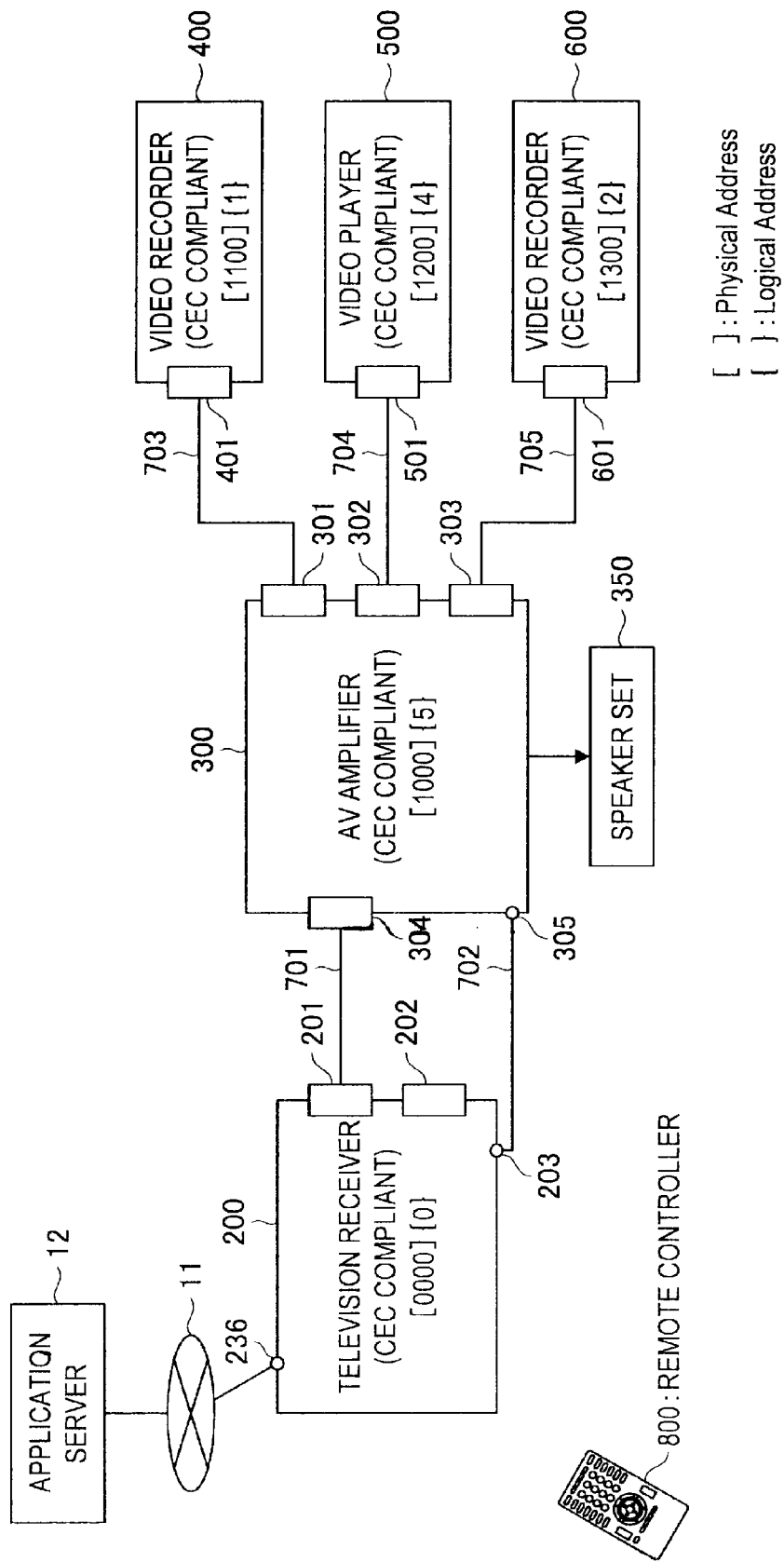
FIG. 1 is a block diagram showing a configuration example of an AV system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Entire configuration example of system [FIGS. 1 and 2]
2. Configuration example of television receiver [FIGS. 3 and 4]
3. Configuration example of AV amplifier [FIG. 5]
4. Configuration example of application server [FIG. 6]
5. HDMI standard transmission configuration and process example [FIGS. 7 to 9]
6. Startup menu display process [FIGS. 10 to 18]
7. Automatic application acquisition process [FIGS. 19 and 20]

1. Entire Configuration Example of System [FIGS. 1 and 2]

Hereinafter, an example of an embodiment of the present invention will be described.

FIG. 1 shows a configuration example of an AV system 100 of the present embodiment.

This AV system 100 includes a television receiver 200, an AV amplifier 300, a video recorder 400, a video player 500, and a video recorder 600. The video recorder 400, the video player 500 and the video recorder 600 constitute HDMI source devices. The AV amplifier 300 constitutes an HDMI repeater device. The television receiver 200 constitutes an HDMI sink device. The video recorder 400, the video player 500 and the video recorder 600 are devices that use a video disc such as a DVD or a hard disk as a recording medium and record and reproduce video data (AV contents).

The television receiver 200 is a CEC compliant device, and includes HDMI terminals 201 and 202, an optical output terminal 203, and a network terminal 236. The television receiver 200 has a configuration that can be remotely controlled by a remote controller 800. The television receiver 200 has a function of properly acquiring an application managed by the application server 12 over the network 11, executing a process based on the application and displaying given information, or controlling a device connected to the television receiver 200 at the HDMI terminals 201 and 202.

The application provided from the application server is produced to be executed in a state in which a video is displayed on the television receiver 200. A user of the television receiver 200 can use the contents provided by the application by causing the application provided from the application server 12 to be executed on the television receiver 200 while viewing a broadcast received by the television receiver 200 or contents played by the video player 500. The video recorder 400 includes an HDMI terminal 401, the video player 500 includes an HDMI terminal 501, and the video recorder 600 includes an HDMI terminal 601, and all of these devices are CEC compliant.

The AV amplifier 300 is a CEC compliant device, and includes HDMI terminals 301, 302, 303, and 304, and an optical input terminal 305. A speaker set 350 including a plurality of speakers is connected to the AV amplifier 300, and an audio signal reproduced in the AV amplifier 300 is output from the speaker set 350. This speaker set 350 includes speakers located at a front, right front, left front, right rear and left rear of a listener, and a subwoofer speaker for bass output which realizes, for example, 5.1 channel surround. The AV amplifier 300 and each speaker may be separate entities, but, for example, the AV amplifier and the respective speakers (at least front speakers) may be housed in a rack in which a television receiver is placed.

The television receiver 200 and the AV amplifier 300 are connected via an HDMI cable 701 and an optical cable 702. That is, one end of the HDMI cable 701 is connected to the HDMI terminal 201 of the television receiver 200 and the other end thereof is connected to the HDMI terminal 304 of the AV amplifier 300. One end of the optical cable 702 is connected to the optical output terminal 203 of the television receiver 200 and the other end thereof is connected to the optical input terminal 305 of the AV amplifier 300.

The AV amplifier 300 and the video recorder 400 are connected via the HDMI cable 703. That is, one end of the HDMI cable 703 is connected to the HDMI terminal 301 of the AV amplifier 300 and the other end thereof is connected to the HDMI terminal 401 of the video recorder 400. The AV amplifier 300 and the video player 500 are also connected via the HDMI cable 704. That is, one end of the HDMI cable 704 is connected to the HDMI terminal 302 of the AV amplifier 300, and the other end thereof is connected to the HDMI terminal 501 of the video player 500. The AV amplifier 300 and the video recorder 600 are connected via the HDMI cable 705. That is, one end of the HDMI cable 705 is connected to the HDMI terminal 303 of the AV amplifier 300, and the other end thereof is connected to the HDMI terminal 601 of the video recorder 600.

In the AV system 100 shown in FIG. 1, a physical address and a CEC logical address of each device are acquired, for example, as follows.

That is, when the AV amplifier 300 is connected to the television receiver 200 (the physical address is [0000] and the CEC logical address is {0}) via the HDMI cable 701, the AV amplifier 300 acquires the physical address [1000] from the television receiver 200 using HDMI control protocol.

The CEC compliant device is defined to acquire a logical address upon HDMI connection. The CEC compliant device performs message transmission and reception using this logical address. FIG. 2 shows a table indicating a correspondence relationship between devices and CEC logical addresses. A device "TV" is a device for displaying a video from a television receiver, a projector and the like. A device "recording device" is a recording device such as a hard disk recorder or a DVD recorder. A device "tuner" is a device for receiving AV contents, such as a set top box (STB) that receives a cable television broadcast. A device "playback device" is a player device such as a video player or a camcorder. A device "audio system" is an audio processing device such as an AV amplifier.

The AV amplifier 300 is a CEC compliant device, as described above. The AV amplifier 300 decides a logical address {5} as "audio system" based on the table of FIG. 2. In this case, the AV amplifier 300 recognizes that a device having this logical address {5} is not included in the other devices with a polling message of the CEC control protocol and then decides the logical address {5} as its logical address. The AV amplifier 300 notifies the television receiver 200 that physical address [1000] corresponds to the CEC compliant device {5} by means of a report physical address of the CEC control protocol.

When the video recorder 400 is connected to the AV amplifier 300 via the HDMI cable 703, the video recorder 400 acquires physical address [1100] from the AV amplifier 300 using HDMI control protocol.

The video recorder 400 is the CEC compliant device, as described above. The video recorder 400 decides logical address {1} as a "recording device" based on the table of FIG. 2. In this case, the video recorder 400 recognizes that a device having this logical address {1} is not included in the other devices with a polling message of the CEC control protocol and then decides the logical address {1} as its logical address. The video recorder 400 notifies the television receiver 200 and the AV amplifier 300 that the physical address [1100] corresponds to the CEC compliant device {1} by means of the report physical address of the CEC control protocol.

When the video player 500 is connected to the AV amplifier 300 via an HDMI cable 704, the video player 500 acquires a physical address [1200] from the AV amplifier 300 using the HDMI control protocol.

The video player 500 is the CEC compliant device, as described above. The video player 500 decides a logical address {4} as a "playback device" based on the table of FIG. 2. In this case, the video player 500 recognizes that a device having this logical address {4} is not included in the other devices with a polling message of the CEC control protocol and then decides the logical address {4} as its logical address. The video player 500 notifies the television receiver 200 and the AV amplifier 300 that a physical address [1200] corresponds to a CEC compliant device {4} by means of the report physical address of the CEC control protocol.

When the video recorder 600 is connected to the AV amplifier 300 via an HDMI cable 705, the video recorder 600 acquires a physical address [1300] from the AV amplifier 300 using the HDMI control protocol.

The video recorder 600 is the CEC compliant device, as described above. The video recorder 600 decides a logical address {2} as a "recording device" based on the table of FIG. 2. In this case, the video recorder 600 recognizes that a device having this logical address {2} is not included in the other devices with a polling message of the CEC control protocol and then decides the logical address {2} as its logical address. The video recorder 600 notifies the television receiver 200 and the AV amplifier 300 that the physical address [1300] corresponds to the CEC compliant device {2} by means of the report physical address of the CEC control protocol.

When a program tuned by a tuner of the television receiver 200 is viewed in the AV system 100 shown in FIG. 1, the following operation is executed. That is, a video by a video signal obtained by the tuner is displayed on a display panel (not shown) of the television receiver 200. An audio (sound) by an audio signal obtained by the tuner is output from speakers (not shown) of the television receiver 200 when the AV amplifier 300 is in a system audio mode of OFF. When the system audio mode is on, audio by the audio signal obtained by the tuner is output from the speaker set 350 connected to the AV amplifier 300.

The audio signal obtained by the tuner of the television receiver 200 becomes, for example, an optical digital audio signal and is supplied to the AV amplifier 300 via the optical cable 702. Further, the ON/OFF of the system audio mode in the AV amplifier 300 may be set by the user manipulating a user manipulation unit (not shown) of the AV amplifier 300 or manipulating a user manipulation unit (not shown) of the television receiver 200. Alternatively, the ON/OFF of the system audio mode in the AV amplifier 300 may be set by instructing speaker switching by manipulating the remote controller 800 of the television receiver 200.

In the AV system 100 shown in FIG. 1, when contents reproduced from the disk in the video recorder 400, or a program selected by the tuner, for example, through a switching manipulation from the television receiver 200, a manipulation of a Play button of the video recorder 400, and the like is viewed, the following operation is performed.

That is, the video by the output video signal of the video recorder 400 is displayed on a display panel (not shown) of the television receiver 200. In this case, the output video signal of the video recorder 400 is supplied to the television receiver 200 via the HDMI cable 703, the AV amplifier 300 and the HDMI cable 701.

When the AV amplifier 300 is in a system audio mode of OFF, the audio by the output audio signal of the video recorder 400 is output from a speaker (not shown) of the television receiver 200. In this case, the output audio signal of the video recorder 400 is supplied to the television receiver 200 via the HDMI cable 703, the AV amplifier 300 and the HDMI cable 701.

When the AV amplifier 300 is in the system audio mode of ON, the audio by the output audio signal of the video recorder 400 is output from the speaker set 350 connected to the AV amplifier 300. In this case, the output audio signal of the video recorder 400 is supplied to the AV amplifier 300 via the HDMI cable 703.

In the AV system 100 shown in FIG. 1, when contents reproduced from the disk by the video player 500, for example, through a switching manipulation from the television receiver 200, a manipulation of a Play button of the video player 500, and the like is viewed, the following operation is performed.

That is, a video by the output video signal of the video player 500 is displayed on a display panel (not shown) of the television receiver 200. In this case, the output video signal of the video player 500 is supplied to the television receiver 200 via the HDMI cable 704, the AV amplifier 300 and the HDMI cable 701.

When the AV amplifier 300 is in the system audio mode of OFF, the audio by the output audio signal of the video player 500 is output from the speaker (not shown) of the television receiver 200. In this case, the output audio signal of the video player 500 is supplied to the television receiver 200 via the HDMI cable 704, the AV amplifier 300 and the HDMI cable 701.

When the AV amplifier 300 is in the system audio mode of ON, the audio by the output audio signal of the video player 500 is output from the speaker set 350 connected to the AV amplifier 300. In this case, the output audio signal of the video player 500 is supplied to the AV amplifier 300 via the HDMI cable 704.

In the AV system 100 shown in FIG. 1, when contents reproduced from the disk in the video recorder 600, or a program selected by the tuner, for example, through a switching manipulation from the television receiver 200 is viewed, the following operation is performed.

That is, the video by the output video signal of the video recorder 600 is displayed on a display panel (not shown) of the television receiver 200. In this case, the output video signal of the video recorder 600 is supplied to the television receiver 200 via the HDMI cable 705, the AV amplifier 300 and the HDMI cable 701.

When the AV amplifier 300 is in the system audio mode of OFF, the audio by the output audio signal of the video recorder 600 is output from the speaker (not shown) of the television receiver 200. In this case, the output audio signal of the video recorder 600 is supplied to the television receiver 200 via the HDMI cable 705, the AV amplifier 300 and the HDMI cable 701.

When the AV amplifier 300 is in the system audio mode of ON, the audio by the output audio signal of the video recorder 600 is output from the speaker set 350 connected to the AV amplifier 300. In this case, the output audio signal of the video recorder 600 is supplied to the AV amplifier 300 via the HDMI cable 705.

2. Configuration Example of Television Receiver [FIGS. 3 and 4]

Figure 3:
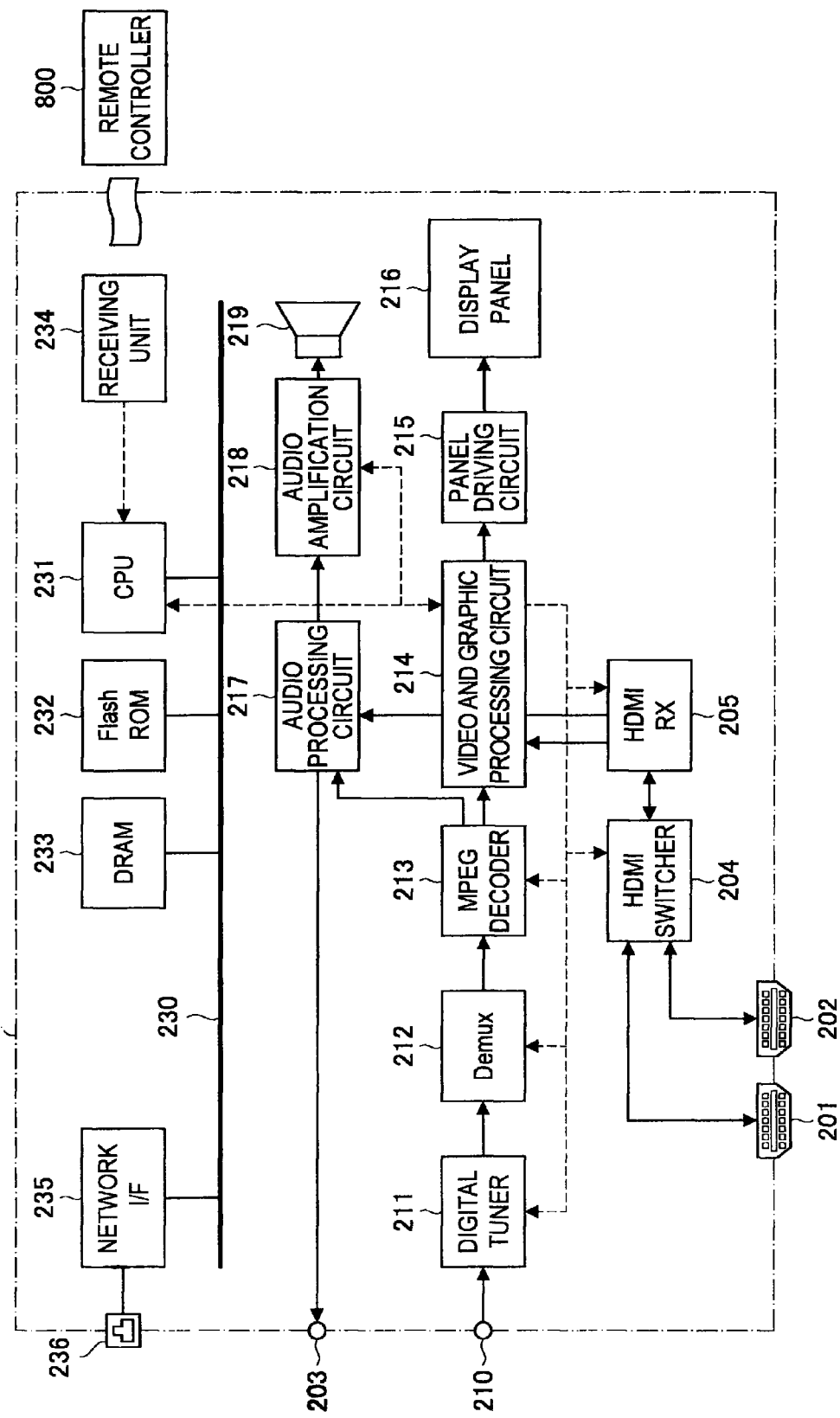
FIG. 3 is a block diagram showing a configuration example of a television receiver (sink device) constituting an AV system according to an embodiment of the present invention.

FIG. 3 shows a configuration example of the television receiver 200 according to an example of the present embodiment. This television receiver 200 includes HDMI terminals 201 and 202, an HDMI switcher 204, an HDMI receiving unit 205, an antenna terminal 210, and a digital tuner 211. The television receiver 200 further includes a demultiplexer (Demux) 212, a Moving Picture Experts Group (MPEG) decoder 213, a video and graphic processing circuit 214, a panel driving circuit 215, and a display panel 216.

The television receiver 200 further includes an audio processing circuit 217, an audio amplification circuit 218, and a speaker 219. The television receiver 200 further includes an internal bus 230, a central processing unit (CPU) 231, a flash ROM 232, a DRAM 233, a receiving unit 234, a network I/F 235, and a network terminal 236.

The CPU 231 functions as a determination unit, an operation control unit, and an acquisition request generator. The CPU 231 executes a program for performing a startup menu display process and an automatic application acquisition process, which will be described. The network I/F 235 functions as an application acquisition unit under control of the CPU 231. The video and graphic processing circuit 214 functions as a display control unit under control of the CPU 231. The display panel 216 functions as a display unit under control of the CPU 231.

The CPU 231 controls an operation of each unit of the television receiver 200. The flash ROM 232 stores control software and data, as well as an application properly downloaded from the application server 12. The DRAM 233 constitutes, for example, a work area for the CPU 231. The CPU 231 develops the software and data read from the flash ROM 232 onto the DRAM 233, starts up the software, and controls each unit of the television receiver 200. The CPU 231, the flash ROM 232 and the DRAM 233 are connected to the internal bus 230.

The receiving unit 234 receives, for example, an infrared remote control signal (remote control code) transmitted from the remote controller 800 and supplies the signal to the CPU 231. The user can manipulate the television receiver 200 and another CEC compliant device connected to the television receiver 200 via the HDMI cable by manipulating the remote controller 800.

The network I/F 235 connects to the network 11 via a network cable connected to a network terminal 236, and executes data transmission and reception to and from various devices (e.g., the application server 12) connected to the network 11. In the present embodiment, the television receiver 200 requests the application server 12 to provide an application for controlling the AV amplifier 300 and properly receives the application from the application server 12, such that the television receiver 200 can start up and execute the application for controlling the AV amplifier 300.

The antenna terminal 210 is a terminal that inputs a television broadcast signal received by a receiving antenna (not shown). The digital tuner 211 processes the television broadcast signal input to the antenna terminal 210, and outputs a given transport stream corresponding to a user-selected channel. The demultiplexer 212 extracts a partial transport stream (TS) (a TS packet of video data and a TS packet of audio data) corresponding to the user-selected channel from the transport stream obtained by the digital tuner 212.

The demultiplexer 212 extracts program specific information/service information (PSI/SI) from the transport stream obtained by the digital tuner 211 and outputs the PSI/SI to the CPU 231. A plurality of channels are multiplexed in the transport stream obtained by the digital tuner 211. The process in which the demultiplexer 212 extracts the partial TS of any channel from the transport stream can be performed by obtaining information of a packet ID (P ID) of any channel from the PSI/SI (PAT/PMT).

The MPEG decoder 213 performs a decoding process on a video packetized elementary stream (PES) packet consisting of the TS packet of the video data obtained by the demultiplexer 212 to obtain video data. Also, the MPEG decoder 213 performs a decoding process on an audio PES packet consisting of the TS packet of the audio data obtained by the demultiplexer 212 to obtain audio data.

The video and graphic processing circuit 214 performs a scaling process, a graphics data superimposing process, and the like on the video data acquired by the MPEG decoder 213, as necessary. Also, the video and graphic processing circuit 214 generates video data through a process based on an application stored in the flash ROM 232 in advance or the application properly provided from the application server 12, and outputs the video data to the panel driving circuit 215. The panel driving circuit 215 drives the display panel 216 based on the video data output from the video and graphic processing circuit 214. The display panel 216 includes, for example, a liquid crystal display (LCD), an organic electro-luminescence (EL), or a plasma display panel (PDP).

The audio processing circuit 217 performs a necessary process, such as D/A conversion, on the audio data obtained by the MPEG decoder 213. The audio amplification circuit 218 amplifies an analog audio signal output from the audio processing circuit 217 and supplies the resultant audio signal to the speaker 219. The audio processing circuit 217 converts the audio data obtained by the MPEG decoder 213 into a digital optical signal and outputs the digital optical signal to the optical output terminal 203.

The HDMI switcher 204 selectively connects the HDMI terminals 201 and 202 to the HDMI receiving unit 205. The HDMI receiving unit 205 is selectively connected to any of the HDMI terminals 201 and 202 via the HDMI switcher 204. This HDMI receiving unit 205 receives video and audio data transmitted from an external device (a source device or a repeater device) connected to the HDMI terminal 201 or 202 through communication conforming to HDMI. This HDMI receiving unit 205 will be described in detail later.

An operation of the television receiver 200 shown in FIG. 3 will be briefly described. The television broadcast signal input to the antenna terminal 210 is supplied to the digital tuner 211. This digital tuner 211 processes the television broadcast signal to obtain a transport stream corresponding to the user-selected channel. This transport stream is supplied to the demultiplexer 212. The demultiplexer 212 extracts a partial TS (a TS packet of video data and a TS packet of audio data) corresponding to the user-selected channel from the transport stream. This partial TS is supplied to the MPEG decoder 213.

The MPEG decoder 213 performs a decoding process on a video PES packet consisting of the TS packet of the video data to obtain video data. The video and graphic processing circuit 214 performs a scaling process, a graphics data superimposing process and the like on the video data, as necessary, and supplies the resultant video data to the panel driving circuit 215. Accordingly, a video corresponding to the user-selected channel is displayed on the display panel 216.

The MPEG decoder 213 performs a decoding process on an audio PES packet consisting of the TS packet of the audio data to obtain audio data. The audio processing circuit 217 performs a necessary process such as D/A conversion on the audio data, and the audio amplification circuit 218 amplifies the audio signal and supplies the audio signal to the speaker 219. Accordingly, an audio corresponding to the user-selected channel is output from the speaker 219.

The audio data obtained by the MPEG decoder 213 is converted into, for example, a digital optical signal conforming to the S/PDIF standard by the audio processing circuit 217, and output to the optical output terminal 203. Accordingly, the television receiver 200 can transmit the audio data to the external device via the optical cable. In the AV system 100 shown in FIG. 1, as described above, the audio data from the television receiver 200 is supplied to the AV amplifier 300 via the optical cable 702.

When the AV amplifier 300 is in a system audio mode of ON, an audio by the audio data from the television receiver 200 is output from the speaker set 350 connected to the AV amplifier 300. In this case, the audio amplification circuit 218 enters a muted state under control of the CPU 231, and the audio is not output from the speaker 219 of the television receiver 200.

In the HDMI receiving unit 205, video and audio data input to the HDMI terminal 201 or 202 via the HDMI cable is obtained. The video data is supplied to the video and graphic processing circuit 214. The audio data is supplied to the audio processing circuit 217. A subsequent operation is the same as that upon reception of the above-described television broadcast signal, the video is displayed on the display panel 216, and the audio is output from the speaker 219.

In the AV system 100 shown in FIG. 1, for example, when video and audio by video data and audio data from the video recorder 400, the video player 500 or the video recorder 600 is presented, the state becomes a state in which video and audio by the video data and the audio data acquired by the HDMI receiving unit 205, as described above, is presented.

Even in this case, when the AV amplifier 300 is in a system audio mode of On, the audio by the audio data is output from the speaker set 350 connected to the AV amplifier 300, and the audio amplification circuit 218 of the television receiver 200 enters a muted state, such that the audio is not output from the speaker 219.

Figure 4:
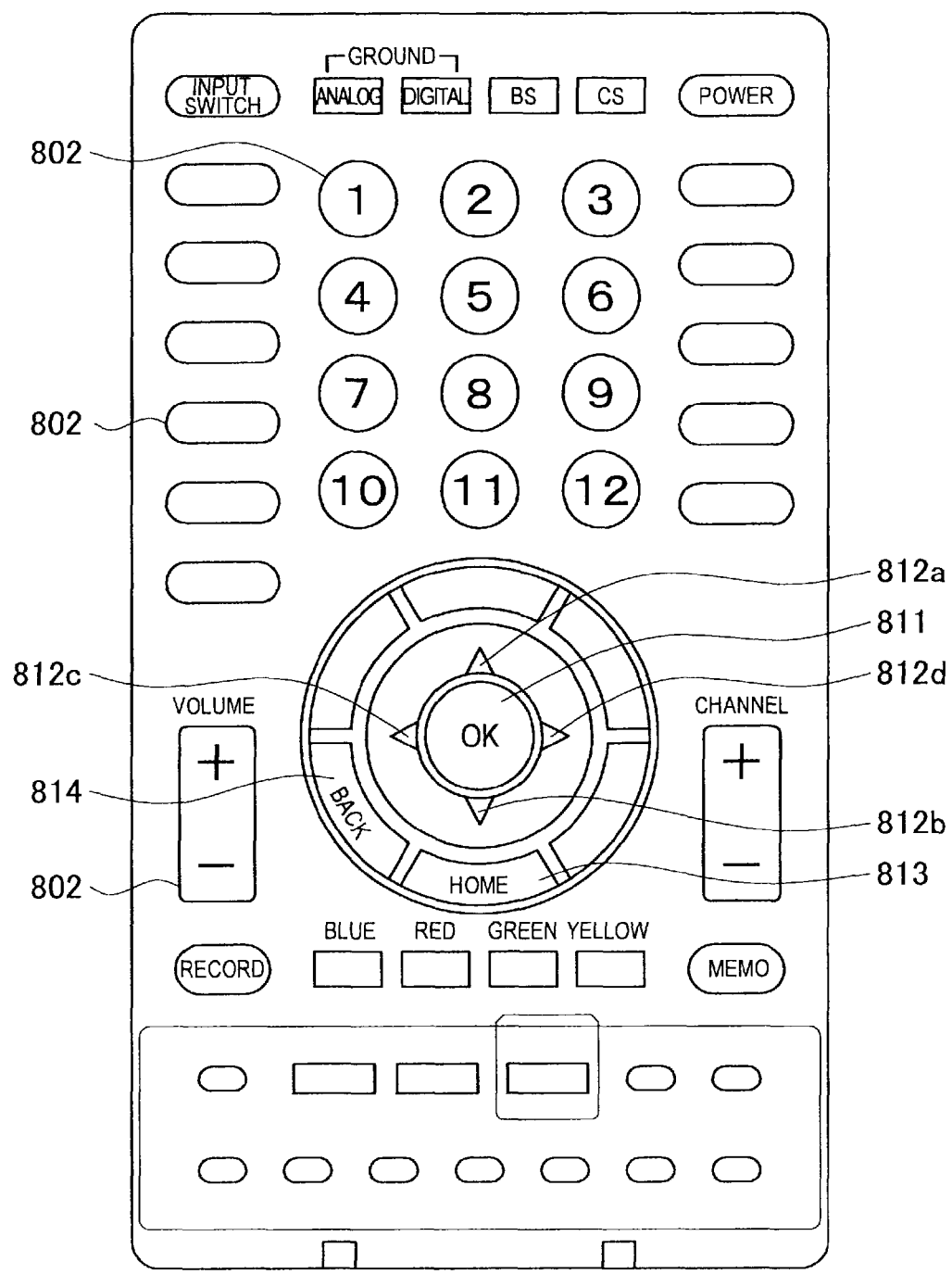
FIG. 4 is a plan view showing a configuration example of a remote controller for the television receiver according to an embodiment of the present invention.

FIG. 4 illustrates an example of a shape of the remote controller 800, viewed from a front view. As shown in FIG. 4, the remote controller 800 includes a remote control signal transmitting unit 801 for transmitting, for example, an infrared signal, in which various manipulation keys 802 are disposed. The manipulation keys 802 include numerical keys for channel indication, a volume up/down key, each mode setting key, and the like. Further, the remote controller 800 includes an OK button 811 for selecting any item from various menu screens displayed on the display panel 216, an up button 812a for moving a cursor displayed on the display panel 216 upward, a down button 812b for moving the cursor displayed on the display panel 216 downward, a left button 812c for moving the cursor displayed on the display panel 216 to the left, a right button 812d for moving the cursor displayed on the display panel 216 to the right, a home button 813 for summoning a screen for executing the application on the television receiver 200 to be displayed on the display panel 216, and a back button 814 for returning to a previous screen. The remote controller 800 may be configured to transmit a signal other than the infrared signal or to bidirectionally exchange the signal with the television receiver 200. Further, the shape of the remote controller 800 or a button arrangement is not limited to such an example in the present invention.

3. Configuration Example of AV Amplifier [FIG. 5]

Figure 5:
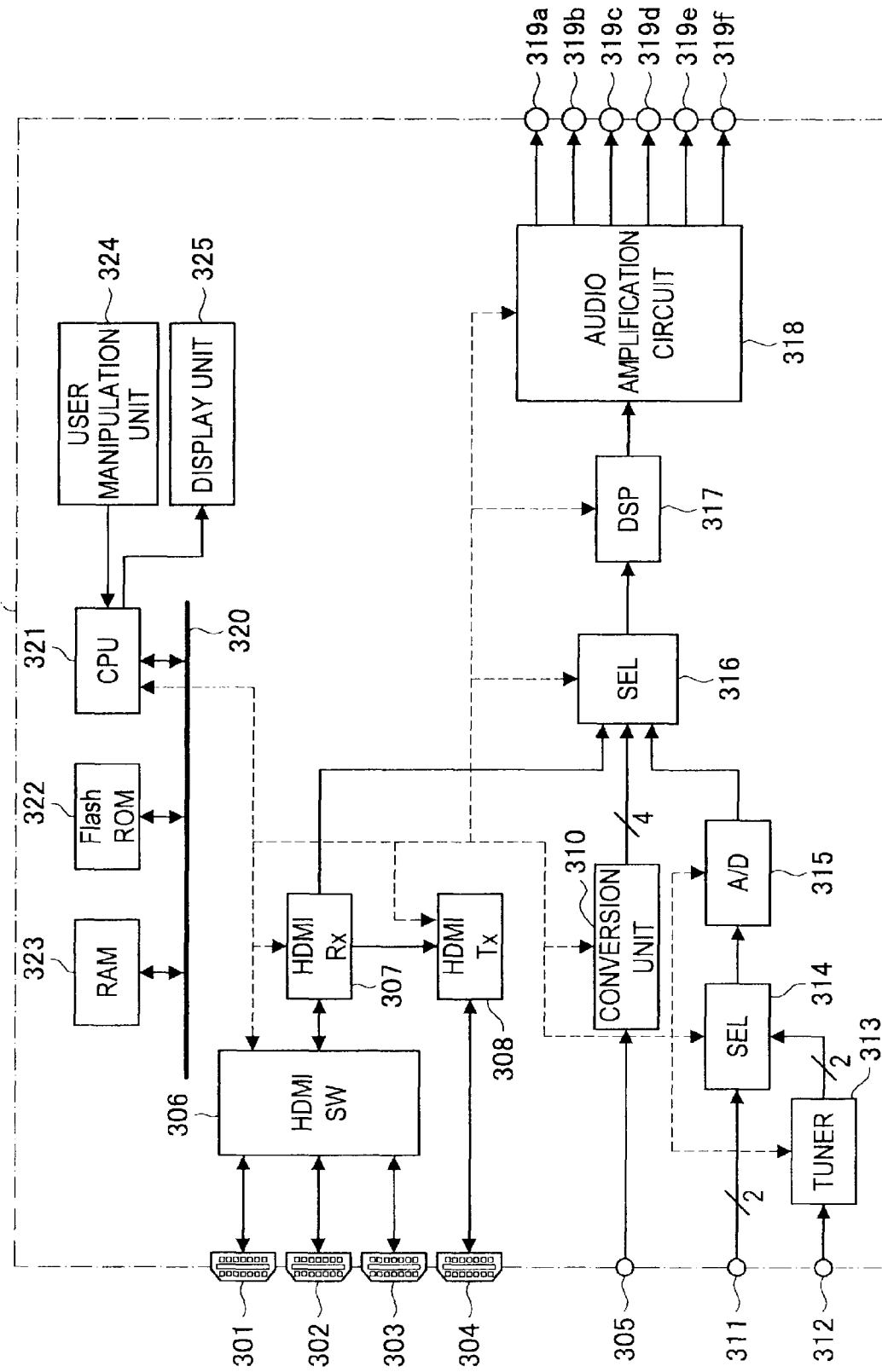
FIG. 5 is a block diagram showing a configuration example of an AV amplifier (repeater device) constituting the AV system according to an embodiment of the present invention.

FIG. 5 shows a configuration example of the AV amplifier 300. The AV amplifier 300 includes HDMI terminals 301 to 304, an optical input terminal 305, an HDMI switcher 306, an HDMI receiving unit 307, an HDMI transmitting unit 308, and a conversion unit 310. The AV amplifier 300 further includes an analog audio input terminal 311, an antenna terminal 312, an FM tuner 313, a selector 314, an A/D converter 315, a selector 316, and a digital signal processor (DSP) 317. Further, the AV amplifier 300 includes an audio amplification circuit 318, audio output terminals 319a to 319f, an internal bus 320, a CPU 321, a flash ROM 322, and a RAM 323.

The CPU 321 controls operation of each unit of the AV amplifier 300. The flash ROM 322 stores control software and data. The RAM 323 constitutes, for example, a work area of the CPU 321. The CPU 321 develops the software or data read from the flash ROM 322 onto the RAM 323 to start up the software and control each unit of the AV amplifier 300. The CPU 321, the flash ROM 322 and the RAM 323 are connected to the internal bus 320. The CPU 321, the flash ROM 322 and the RAM 323 may be a microcomputer of one chip (one chip microcomputer).

A user manipulation unit 324 and a display unit 325 are connected to the CPU 321. The user manipulation unit 324 and the display unit 325 constitute a user interface. Using the user manipulation unit 324, the user can perform selection of an output audio of the AV amplifier 300, tuning by the FM tuner 313, an operation setting, and the like. The user can set the system audio mode to ON/OFF using the user manipulation unit 324.

This user manipulation unit 324 includes keys, buttons, a dial, a remote control signal transmitting and receiving unit, and the like disposed on a chassis, which is not shown, of the AV amplifier 300. The display unit 325 displays an operation status of the AV amplifier 300, a user manipulation state, and the like, and includes a fluorescent display tube, an LCD, or the like.

The optical input terminal 305 is a terminal that inputs a digital optical signal via the optical cable. The conversion unit 310 generates a clock LRCK having the same frequency (e.g., 44.1 kHz) as a sampling frequency of an audio signal, a master clock MCK that is, for example, 512 or 256 times the sampling frequency, left and right 24-bit audio data LDATA and RDATA occurring every period of the clock LRCK, and a bit clock BCK synchronized with each bit of the data from the digital optical signal input to the optical input terminal 305, and supplies them to the selector 316.

The analog audio input terminal 311 is a terminal that inputs left and right analog audio signals obtained in the external device. The antenna terminal 312 is a terminal that inputs an FM broadcast signal FM received by a receiving antenna (not shown). The FM tuner 313 processes the FM broadcast signal (radio broadcast signal) input to the antenna terminal 312 to output left and right analog audio signals corresponding to the user-selected channel. The selector 314 selects the analog audio signal input to the analog audio input terminal 311 or the analog audio signal output from the tuner 313. The A/D converter 315 converts the analog audio signal selected by the selector 314 into digital audio data and supplies the digital audio data to the selector 316.

The HDMI switcher 306 selectively connects the HDMI terminals 301 to 303 to the HDMI receiving unit 307. The HDMI receiving unit 307 is selectively connected to any of the HDMI terminals 301 to 303 via the HDMI switcher 306. This HDMI receiving unit 307 receives video and audio data transmitted in one direction from external devices (source devices) connected to the HDMI terminals 301 to 303 through communication conforming to HDMI.

The HDMI receiving unit 307 supplies the audio data to the selector 316, and supplies the video and audio data to the HDMI transmitting unit 308. The HDMI transmitting unit 308 transmits, from the HDMI terminal 304, the baseband video and audio data supplied from the HDMI receiving unit 307 through the communication conforming to HDMI. Thus, the AV amplifier 300 has a repeater function. The HDMI receiving unit 307 and the HDMI transmitting unit 308 will be described in detail later.

The selector 316 selects the audio data supplied from the HDMI receiving unit 307, the audio data supplied from the conversion unit 310 or the audio data supplied from the A/D converter 315, and supplies the audio data to the DSP 317.

The DSP 317 performs a process of processing the audio data obtained by the selector 316 to generate audio data of each channel for realizing surround audio, a process of giving a given sound field property and an acoustic property, a process of converting a digital signal into an analog signal, and the like. For example, the DSP 317 can perform sound field processing of 5.1 channel surround audio, and enables another mode such as 2-channel audio. The audio amplification circuit 318 amplifies a front left audio signal SFL, a front right audio signal SFR, a front center audio signal SFC, a rear left audio signal SRL, a rear right audio signal SRR and a subwoofer audio signal SSW output from the DSP 317, and outputs the signals to the audio output terminals 319a to 319f.

Although not shown, speaker constituting the speaker set 350 are connected to the audio output terminals 319a to 319f. That is, a front left speaker, a front right speaker, a front center speaker, a rear left speaker, a rear right speaker and a subwoofer speaker are connected. Here, through, for example, a virtual sound localization process in the DSP 317, surround audio may be reproduced by a smaller number of speakers.

An operation of the AV amplifier 300 shown in FIG. 5 will be briefly described. In the HDMI receiving unit 307, the baseband video and audio data input to the HDMI terminals 301 to 303 via the HDMI cable is obtained. This video and audio data is supplied to the HDMI transmitting unit 308 and transmitted to the HDMI cable connected to the HDMI terminal 304.

Further, the audio data obtained in the HDMI receiving unit 307 is supplied to the selector 316. In the selector 316, the audio data supplied from the HDMI receiving unit 307, the audio data supplied from the conversion unit 310, or the audio data supplied from the A/D converter 315 is selected and supplied to the DSP 317.

In the DSP 317, necessary processes such as a process of generating audio data of each channel for realizing the 5.1 channel surround, a process of giving a given sound field property, a process of converting the digital signal into an analog signal, and the like are performed on the audio data. Audio signals of respective channels output from the DSP 317 are output to the audio output terminals 319a to 319f via the audio amplification circuit 318.

For example, in the AV system 100 shown in FIG. 1, when the program tuned by the digital tuner 211 of the television receiver 200 is viewed and the AV amplifier 300 is in a system audio mode of ON, the following operation is performed. That is, the selector 316 selects the audio data from the conversion unit 310. Accordingly, the audio signals of the respective channels according to the audio data of the program tuned by the digital tuner 211 of the television receiver 200 are output from the audio output terminals 319a to 319f. Thus, the audio of the program tuned by the digital tuner 211 of the television receiver 200 is output from the speaker set 350 connected to the AV amplifier 300.

When the program tuned by the digital tuner 211 of the television receiver 200 is viewed and the AV amplifier 300 is in the system audio mode of OFF, the audio amplification circuit 318 enters a muted state. Accordingly, the audio signal is not supplied from the audio amplification circuit 318 to the output terminals 319a to 319f.

For example, in the AV system 100 shown in FIG. 1, when a video and audio by the video data and the audio data from the video recorder 400 are presented and the AV amplifier 300 is in the system audio mode of ON, the following operation is performed. That is, the HDMI terminal 301 is connected to the HDMI receiving unit 307 by the HDMI switcher 306. Further, in the selector 316, the audio data from the HDMI receiving unit 307 is selected. Accordingly, the audio signals of the respective channels according to the audio data from the video recorder 400 are output from the audio output terminals 319a to 319f. Thus, the audio by the audio data from the video recorder 400 is output from the speaker set 350 connected to the AV amplifier 300.

When the video and audio by video data and the audio data from the video recorder 400 are presented and the AV amplifier 300 is in the system audio mode of OFF, the audio amplification circuit 318 enters a muted state, and the audio signal is not supplied from the audio amplification circuit 318 to the audio output terminals 319a to 319f.

For example, in the AV system 100 shown in FIG. 1, when the video and audio by the video data and the audio data from the video player 500 are presented and the AV amplifier 300 is in the system audio mode of ON, the following operation is performed. That is, the HDMI terminal 302 is connected to the HDMI receiving unit 307 by the HDMI switcher 306. Further, in the selector 316, the audio data from the HDMI receiving unit 307 is selected. Accordingly, the audio signals of the respective channels according to the audio data from the video player 500 are output from the audio output terminals 319a to 319f. Thus, the audio by the audio data from the video player 500 is output from the speaker set 350 connected to the AV amplifier 300.

When the video and audio by the video data and the audio data from the video player 500 are presented and the AV amplifier 300 is in the system audio mode of OFF, the audio amplification circuit 318 enters a muted state, and the audio signal is not supplied from the audio amplification circuit 318 to the audio output terminals 319a to 319f.

4. Configuration Example of Application Server [FIG. 6]

Figure 6:
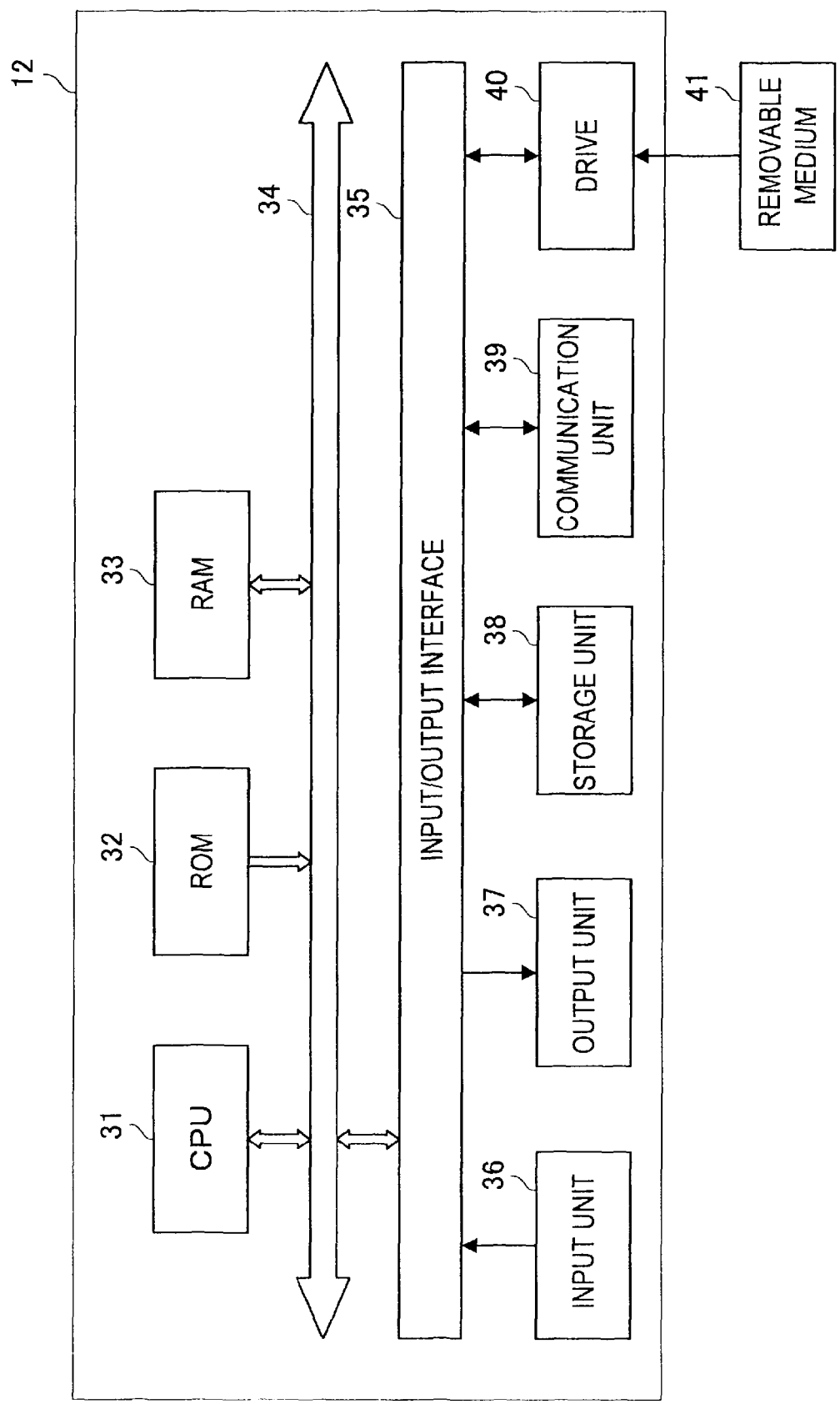
FIG. 6 is a block diagram showing a configuration example of an application server in an embodiment of the present invention.

FIG. 6 shows a configuration example of the application server 12. The application server 12 includes a CPU 31, a ROM 32, a RAM 33, a bus 34, an input/output interface 35, an input unit 36, an output unit 37, a storage unit 38, a communication unit 39, and a drive 40.

The CPU 31, the ROM 32, and the RAM 33 are connected to one another via the bus 34. The input/output interface 35 is also connected to the bus 34. The input unit 36 such as a keyboard, a mouse or a microphone, the output unit 37 such as a display or a speaker, the storage unit 38 such as a hard disk or a nonvolatile memory, the communication unit 39 such as a network interface or a removable medium 41 such as a magnetic disk, an optical disk or a magneto-optical disk, and the drive for driving a semiconductor memory are connected to the input/output interface 35.

In the application server 12 configured as described above, the CPU 31 loads, for example, a program stored in the storage unit 38 onto the RAM 33 via the input/output interface and the bus 34 and executes the program, such that the application server 12 can properly provide the application according to the request from the television receiver 200.

5. HDMI Standard Transmission Configuration and Process Example [FIGS. 7 to 9]

Figure 7:
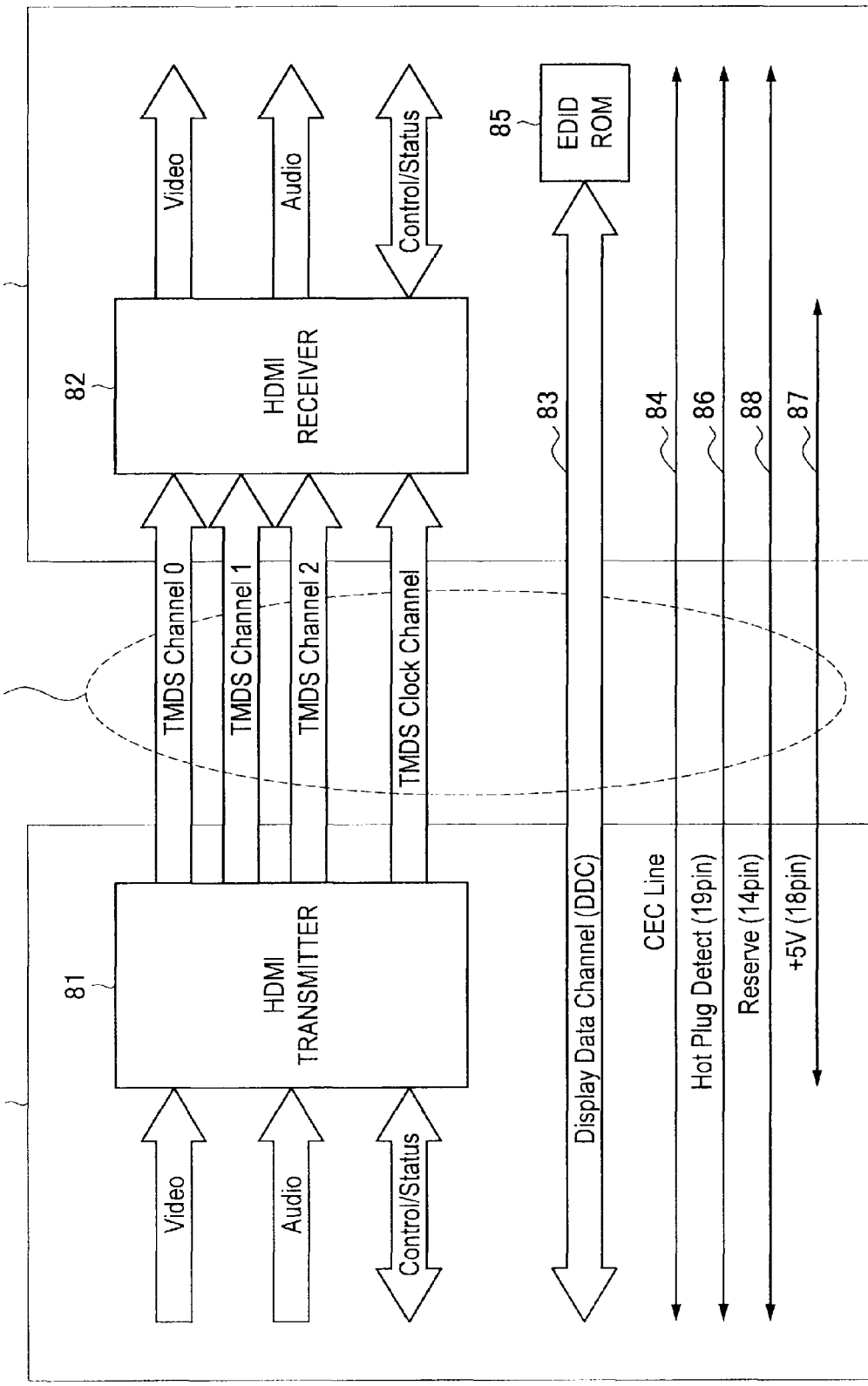
FIG. 7 is a block diagram showing a configuration example of an HDMI transmitting unit (HDMI source) and an HDMI receiving unit (HDMI sink)

FIG. 7 shows a configuration example of the HDMI transmitting unit (HDMI transmitting unit 308) and the HDMI receiving unit (HDMI receiving unit 205 and HDMI receiving unit 307).

The HDMI transmitting unit (HDMI source) performs transmission in one unit in a valid video period (hereinafter, referred to properly as an active video period) that is a period obtained by excluding a horizontal blacking period and a vertical blacking period from a period from one vertical synchronization signal to a next vertical synchronization signal. That is, in the active video period, the HDMI transmitting unit transmits, in one direction, a differential signal corresponding to non-compressed video pixel data corresponding to one screen to the HDMI receiving unit (HDMI sink) via a plurality of channels. In the horizontal blacking period or the vertical blacking period, the HDMI transmitting unit transmits, in one direction, a differential signal corresponding to at least the audio data associated with the video, control data, other auxiliary data, and the like to the HDMI receiving unit via a plurality of channels.

The HDMI transmitting unit includes a transmitter 81. The transmitter 81 converts, for example, non-compressed video pixel data into a corresponding differential signal, and serially transmits, in one direction, the differential signal to the HDMI receiving unit connected via the HDMI cable via a plurality of channels, i.e., three TMDS channels #0, #1 and #2.

The transmitter 81 converts audio data associated with non-compressed video, necessary control data, other auxiliary data and the like into a corresponding differential signal. The transmitter 81 serially transmits, in one direction, the differential signal to the HDMI receiving unit connected via the HDMI cable, via three TMDS channels #0, #1 and #2.

The transmitter 81 transmits the pixel clock synchronized to the pixel data transmitted via three TMDS channels #0, #1 and #2 to the HDMI receiving unit connected via the HDMI cable via the TMDS clock channel. Here, via one TMDS channel #i (i□0, 1, 2), 10-bit pixel data is transmitted during one clock of the pixel clock.

The HDMI receiving unit, in an active video period, receives a differential signal corresponding to the pixel data that is transmitted in one direction from the HDMI transmitting unit via a plurality of channels. Further, the HDMI receiving unit, in the horizontal blacking period or the vertical blacking period, receives a differential signal corresponding to audio data or control data that is transmitted in one direction from the HDMI transmitting unit via a plurality of channels.

That is, the HDMI receiving unit includes a receiver 82. The receiver 82 receives a differential signal corresponding to the pixel data and a differential signal corresponding to the audio data or the control data transmitted in one direction from the HDMI transmitting unit via the TMDS channels #0, #1 and #2. In this case, the receiver 82 receives in synchronization with the pixel clock transmitted from the HDMI transmitting unit via the TMDS clock channel.

The transmission channels of the HDMI system include three TMDS channels #0 to #2 as transmission channels for serially transmitting pixel data and audio data, and a TMDS clock channel as a transmission channel that transmits a pixel clock. Further, there is a transmission channel called a display data channel (DDC) 83 or a CEC line 84.

The DDC 83 is used for the HDMI transmitting unit to read enhanced extended display identification data (E-ED ID) from the HDMI receiving unit connected via the HDMI cable. The DDC 83 includes two signal lines, not shown, included in the HDMI cable.

That is, the HDMI receiving unit includes an ED ID ROM 85, in addition to the HDMI receiver 82. The ED ID ROM 85 stores an E-ED ID that is performance information about its performance (configuration/capability). The HDMI transmitting unit reads, from the HDMI receiving unit connected via the HDMI cable, the E-ED ID of the HDMI receiving unit via the DDC 83. Based on the read E-ED ID, the HDMI transmitting unit, for example, recognizes a format (profile) of a video to which an electronic device having the HDMI receiving unit corresponds, such as RGB, YCbCr4:4:4, YCbCr4:2:2, and the like.

The CEC line 84 includes one signal line, which is not shown, included in the HDMI cable, and is used to perform bidirectional communication of control data between the HDMI transmitting unit and the HDMI receiving unit. The bidirectional communication is performed in time division.

A line 86 connected to a pin called a hot plug detect (HPD) is included in the HDMI cable. A source device can detect a connection of a sink device using the line 86. Further, the HDMI cable includes a line 87 used to supply power from the source device to the sink device. The HDMI cable also includes a reserved line 88.

Figure 8:
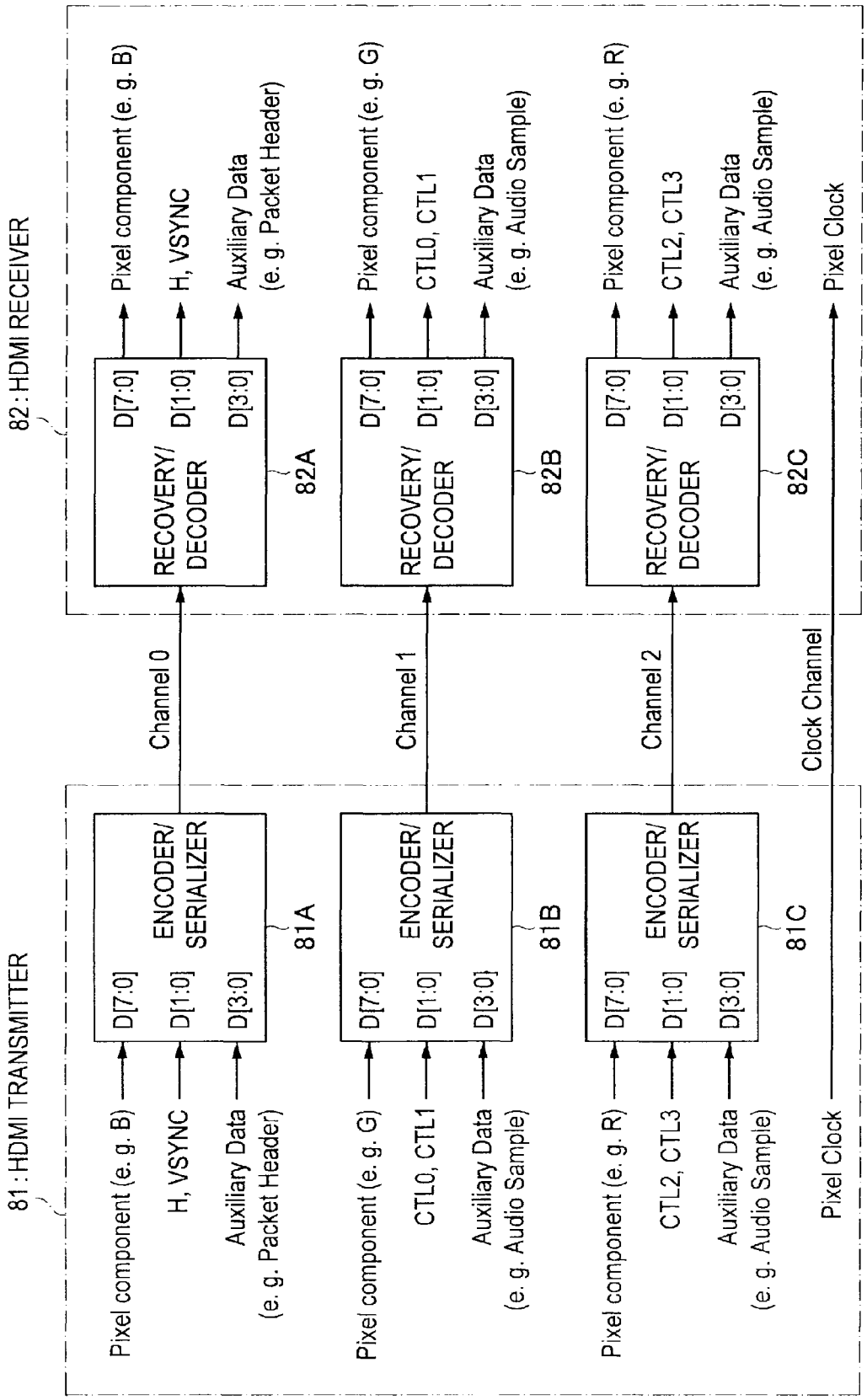
FIG. 8 is a block diagram showing a configuration example of an HDMI transmitter and an HDMI receiver.

FIG. 8 shows a configuration example of the HDMI transmitter 81 and the HDMI receiver 82 of FIG. 7.

The HDMI transmitter 81 includes three encoder/serializers 81A, 81B and 81C corresponding to three TMDS channels #0, #1 and #2. Each of the encoder/serializers 81A, 81B and 81C encodes supplied video data, auxiliary data, and control data, converts parallel data into serial data, and transmits the serial data by means of a differential signal.

Here, when the video data has, for example, 3 components: R (red), G (greed) and B (blue), the following operation is performed. That is, the B component is supplied to the encoder/serializer 81A, the G component is supplied to the encoder/serializer 81B, and the R component is supplied to the encoder/serializer 81C.

The auxiliary data includes, for example, audio data and a control packet. For example, the control packet is supplied to the encoder/serializer 81A and the audio data is supplied to the encoder/serializers 81B and 81C.

Further, the control data includes a 1-bit vertical synchronization signal (VSYNC), a 1-bit horizontal synchronization signal (HSYNC), and control bits CTL0, CTL1, CTL2, and CTL3, each being 1 bit. The vertical synchronization signal and the horizontal synchronization signal are supplied to the encoder/serializer 81A. The control bits CTL0 and CTL1 are supplied to encoder/serializer 81B, and the control bits CTL2 and CTL3 are supplied to encoder/serializer 81C.

The encoder/serializer 81A transmits, in time division, the B component of the video data, the vertical synchronization signal and the horizontal synchronization signal, and the auxiliary data, which are supplied. That is, the encoder/serializer 81A converts the supplied B component of the video data into parallel data in an 8-bit unit that is a fixed bit number. Further, the encoder/serializer 81A encodes the parallel data, converts it into serial data, and transmits the serial data via the TMDS channel #0.

Further, the encoder/serializer 81A encodes 2-bit parallel data of the supplied vertical synchronization signal and horizontal synchronization signal, converts the parallel data into serial data, and transmits the serial data via the TMDS channel #0. The encoder/serializer 81A also converts the supplied auxiliary data into parallel data in a 4-bit unit. The encoder/serializer 81A encodes the parallel data, converts the parallel data into serial data, and transmits the serial data via the TMDS channel #0.

The encoder/serializer 81B transmits, in time division, the G component of the video data, the control bits CTL0 and CTL1, and the auxiliary data that are supplied. That is, the encoder/serializer 81B converts the supplied G component of the video data into parallel data in an 8-bit unit that is a fixed bit number. Further, the encoder/serializer 81B encodes the parallel data, converts the parallel data into serial data, and transmits the serial data via the TMDS channel #1.

The encoder/serializer 81B encodes 2-bit parallel data of the supplied control bits CTL0 and CTL1, converts the parallel data into serial data, and transmits serial data via the TMDS channel #1. Further, the encoder/serializer 81B converts the supplied auxiliary data into parallel data in a 4-bit unit. The encoder/serializer 81B encodes the parallel data, converts the parallel data into serial data, and transmits the serial data via the TMDS channel #1.

The encoder/serializer 81C transmits, in time division, the R component of the video data, the control bits CTL2 and CTL3, and the auxiliary data that are supplied. That is, the encoder/serializer 81C converts the supplied R component of the video data into parallel data in an 8-bit unit that is a fixed bit number. Further, the encoder/serializer 81C encodes the parallel data, converts the parallel data into serial data, and transmits the serial data via the TMDS channel #2.

The encoder/serializer 81C encodes 2-bit parallel data of the supplied control bits CTL2 and CTL3, converts parallel data into serial data, and transmits the serial data via the TMDS channel #2. Further, the encoder/serializer 81C converts the supplied auxiliary data into parallel data in a 4-bit unit. The encoder/serializer 81C encodes the parallel data and converts the parallel data into serial data, and transmits the serial data via the TMDS channel #2.

The receiver 82 includes three recovery/decoders 82A, 82B and 82C corresponding to the three TMDS channels #0, #1 and #2. The respective recovery/decoders 82A, 82B and 82C receive the video data, the auxiliary data, and the control data transmitted by the differential signal via the TMDS channels #0, #1 and #2. Further, each of the recovery/decoders 82A, 82B and 82C converts the video data, the auxiliary data and the control data from serial data to parallel data, decodes the parallel data, and outputs the resultant data.

That is, the recovery/decoder 82A receives the B component of the video data, the vertical synchronization signal and the horizontal synchronization signal, and the auxiliary data transmitted by the differential signal via the TMDS channel #0. The recovery/decoder 82A converts the B component of the video data, the vertical synchronization signal and the horizontal synchronization signal, and the auxiliary data from the serial data to the parallel data, decodes the parallel data and outputs the resultant data.

The recovery/decoder 82B receives the G component of the video data, the control bits CTL0 and CTL1, and the auxiliary data transmitted by the differential signal via the TMDS channel #1. The recovery/decoder 82B converts the G component of the video data, the control bits CTL0 and CTL1, and the auxiliary data from the serial data to parallel data, decodes the parallel data and outputs the resultant data.

The recovery/decoder 82C receives the R component of the video data, the control bits CTL2 and CTL3, and the auxiliary data transmitted by the differential signal via the TMDS channel #2. The recovery/decoder 82C converts the R component of the video data, the control bits CTL2 and CTL3, and the auxiliary data from the serial data to the parallel data, decodes the parallel data and outputs the resultant data.

Figure 9:
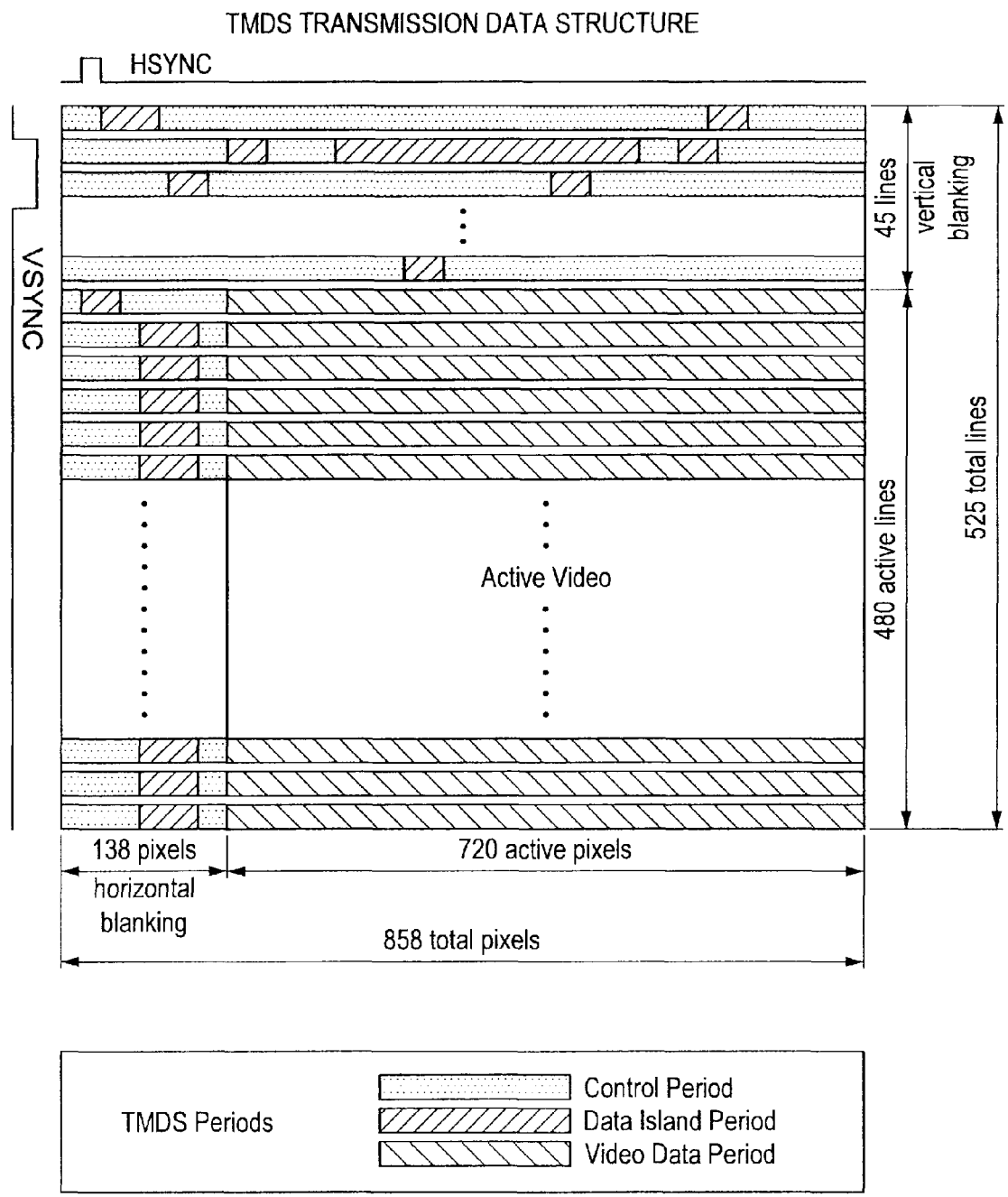
FIG. 9 shows a structure of TMDS transmission data.

FIG. 9 shows an example of a transmission period (section) in which various transmission data is transmitted via three TMDS channels #0, #1 and #2 of HDMI. FIG. 9 shows a period of various transmission data when a progressive video of 720×480 pixels is transmitted in the TMDS channels #0, #1 and #2.

A video field in which the transmission data is transmitted via the three TMDS channels #0, #1 and #2 of HDMI includes the following periods according to the type of the transmission data. That is, the video field includes three periods: a video data period, a data island period, and a control period.

The video field period is a period from an active edge of any vertical synchronization signal to an active edge of a next vertical synchronization signal. This period is divided into a horizontal blanking period, a vertical blanking period, and an active video period. The active video period is a period obtained by excluding the horizontal blanking period and the vertical blanking period from the video field period.

The video data period is assigned to the active video period. In this video data period, active pixel data of 720 pixels×480 lines constituting non-compressed video data corresponding to one screen is transmitted.

The data island period and the control period are assigned to the horizontal blanking period and the vertical blanking period. In the data island period and the control period, the auxiliary data is transmitted.

That is, the data island period is assigned to a portion of the horizontal blanking period and the vertical blanking period. In this data island period, for example, an audio data packet that is data not related to the control among the auxiliary data is transmitted.

The control period is assigned to portions other than the horizontal blanking period and the vertical blanking period. In this control period, for example, the vertical synchronization signal and the horizontal synchronization signal, the control packet and the like that are control-related data among the auxiliary data are transmitted.

Here, in the current HDMI, a frequency of the pixel clock transmitted via the TMDS clock channel is, for example, 165 MHz, and in this case, a transmission rate of the data island period is about 500 Mbps.

6. Startup Menu Display Process [FIGS. 10 to 18]

Figure 10:
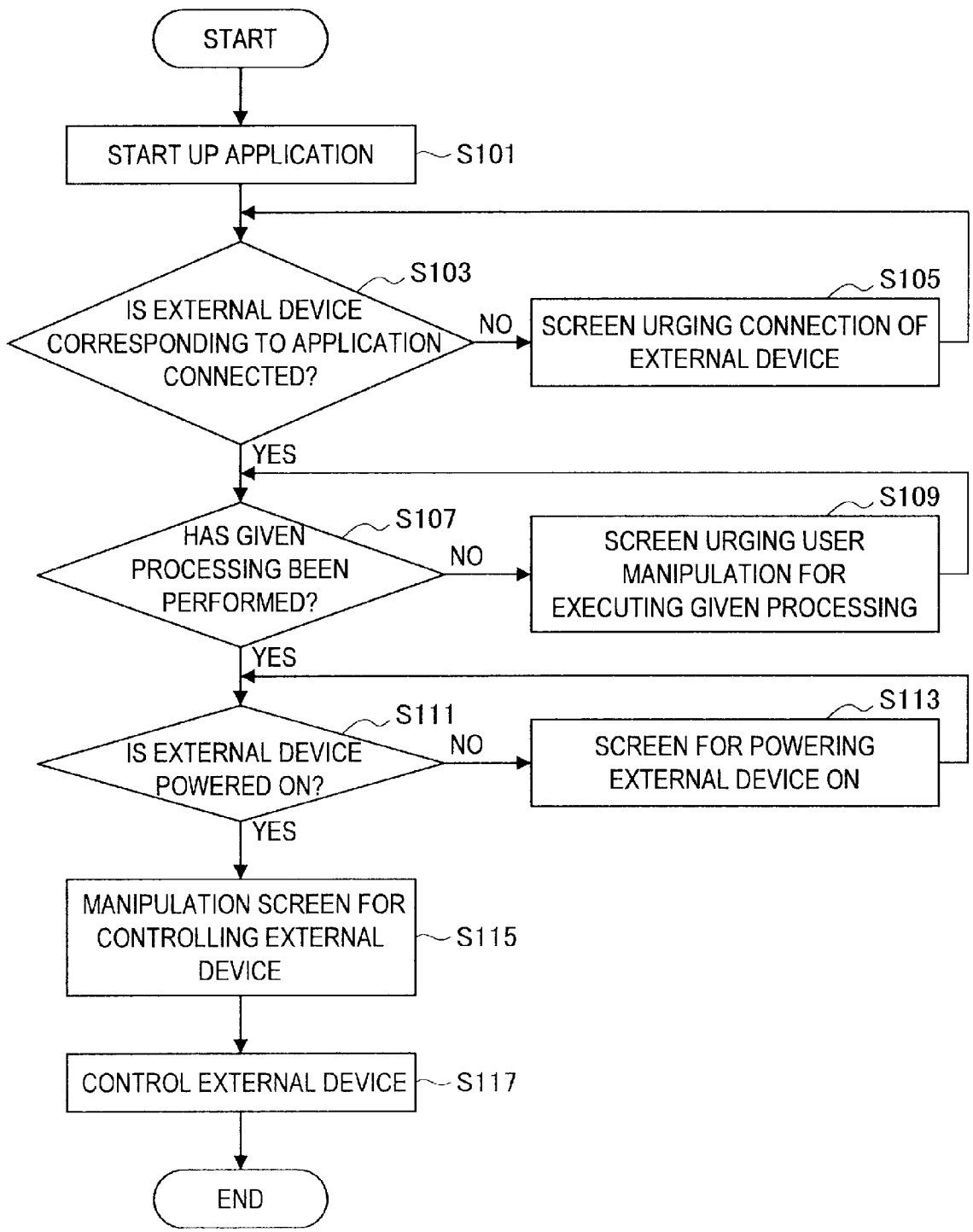
FIG. 10 is a flowchart showing a procedure of a startup menu display process according to an embodiment of the present invention.
Figure 11:
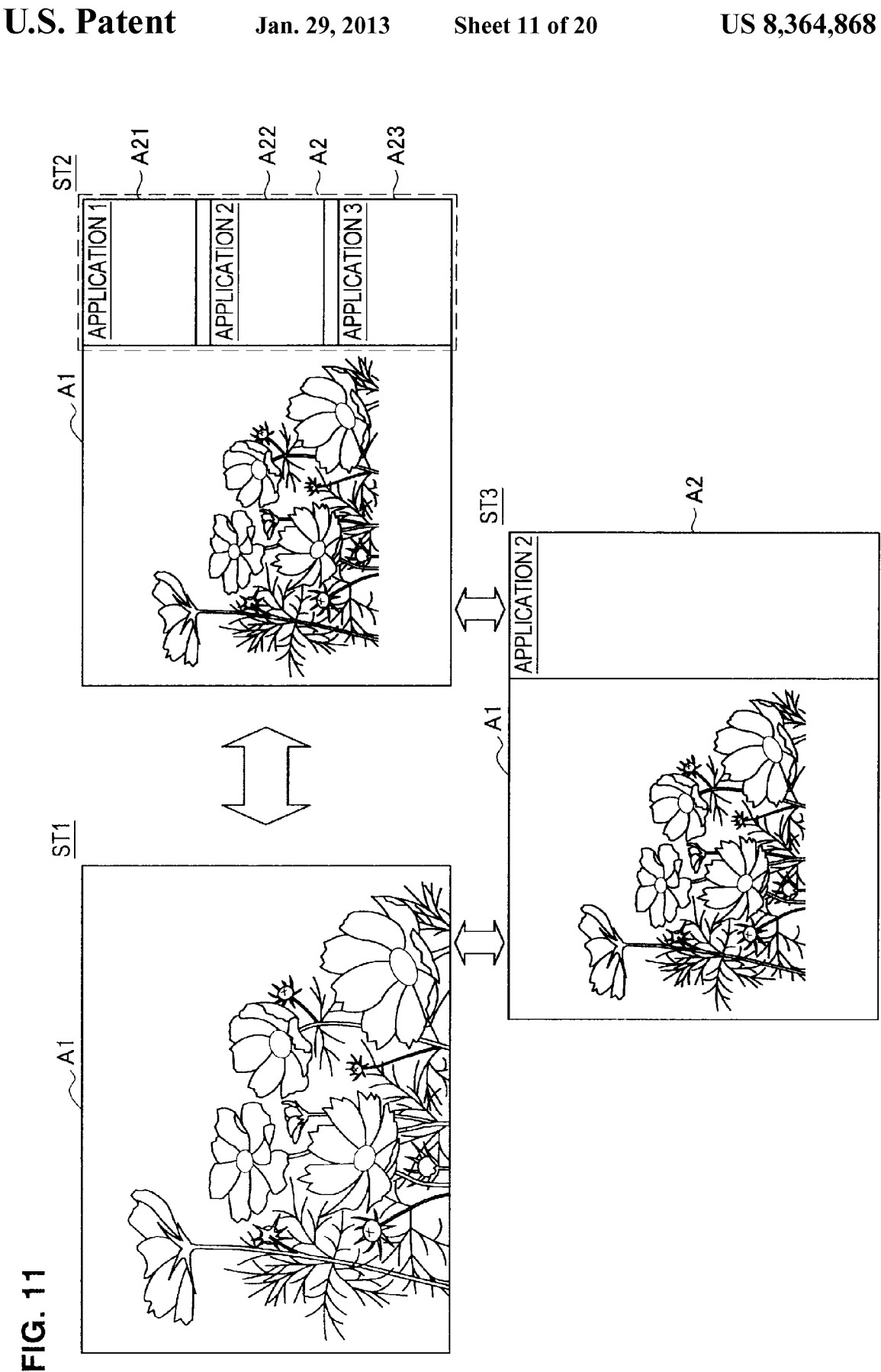
FIG. 11 shows a transition of a display area displayed on the television receiver.

In FIG. 10, a procedure of the startup menu display process according to an embodiment of the present invention is shown. In FIG. 11, a transition of a display area displayed on the television receiver 200 is shown.

As shown in FIG. 11, the television receiver 200 can operate in a video display mode or an application display mode. In the video display mode, a video display area A1 in which broadcast video, reproduced video, or the like is displayed is set on the display panel 216 (state ST1). In the application display mode, the video display area A1 and an application display area A2 in which information provided by the application is displayed are set (states ST2 and ST3). Here, at least one application including a device control application described below is executed on the television receiver 200.

In the application display mode, a normal mode or an active mode is switched according to a given manipulation by the user. In the normal mode, information provided by a plurality of applications is displayed in the application display area A2 (state ST2), and in the active mode, only information provided by a single application is displayed (state ST3).

As shown in FIG. 10, in the television receiver 200, a device control application (hereinafter, also referred to simply as an application) acquired from the application server 12 starts up according to a given manipulation by the user (step S101).

When the application starts up, a determination is made as to whether an external device such as the AV amplifier 300 corresponding to the application has been connected (S103). When the external device is connected, a process in step S107 is performed, and when the external device is not connected, a screen urging a connection of the external device is displayed (S105).

Here, the connection determination is made based on the address notification or the polling response input from the external device via the HDMI cable 701. Specifically, when the external device is connected, the HPD terminal transitions from a low level to a high level, an HDMI receiving unit of the external device (e.g., the HDMI receiving unit 307 of the AV amplifier 300) acquires a physical address, and acquires a logical address through a polling operation. The external device broadcasts a physical address report using a given logical address, and notifies another external device of its existence. Further, information for confirming a correspondence relationship between external devices and applications is transmitted and received between the television receiver 200 and the external device.

When an external device corresponding to the application is connected or an external device is newly connected, a determination is made as to whether a given process has already been executed (S107). When the given process has already been executed, a process in step S111 is performed, and when the given process has not yet been executed, a screen urging a user manipulation for executing the given process is displayed (S109).

Here, the given process refers to, for example, a process of displaying a manipulation screen for controlling an operation of the external device through the application. The manipulation screen is displayed in the active mode transitioning from the above-described normal mode. Accordingly, an appropriate manipulation can be urged to the user according to whether the external device is manipulated through the manipulation screen.

Here, the execution determination is made, for example, using an execution flag set on, for example, the flash ROM 232. That is, after the application is subjected to the given process, the execution flag is updated, and the execution flag is confirmed in a next use to determine whether the given process has already been executed.

When the given process has already been executed or is newly executed, a determination is made as to whether the external device has been powered on (S111). When the external device has been powered on, a process in step S115 is performed, and when the external device is not powered on, a screen for powering the external device on is displayed (S113).

Here, the determination of the power-on is made, for example, based on the polling response input from the external device via the HDMI cable 701. Further, the power-on is performed by transmitting a power-on control signal to the external device via the HDMI cable 701 only when the external device is not powered on.

When the external device has been powered on or is newly powered on, a manipulation screen for controlling an operation of the external device is displayed (S115). In the television receiver 200, the operation of the external device is controlled with the user manipulation performed through the manipulation screen (S117).

Here, in the television receiver 200, a status voluntary generation setting request is transmitted to the external device before the manipulation screen is displayed. The external device is set to transmit a signal indicating the status of the external device to the television receiver 200 according to a change of the status of the external device when the external device receives the setting request. The status of the external device is displayed on the manipulation screen. Further, the operation control is performed by transmitting a control signal for controlling an operation of the external device to the external device via the HDMI cable 701 according to the user manipulation.

In FIGS. 12 to 16, an example of a screen displayed in the startup menu display process is shown. In the television receiver 200, for example, data for displaying the screen as shown in FIGS. 12 to 16 is stored in, for example, the flash ROM 232 and displayed on the display panel 216. Hereinafter, a case in which an operation of the AV amplifier 300 as an example of an external device is controlled will be described.

In FIG. 12, the screen displayed according to the results of the connection determination and the execution determination is shown. As shown in FIG. 12, a series of screens that are partially different according to the determination results are displayed in the application display area A22 shown in FIG. 11. The series of screens are automatically switched and repeatedly displayed at given time intervals if an event such as user manipulation does not occur. As the series of screens, screens M11 and M12 explaining the overview of the application are first displayed.

Subsequent to the screen M12, a screen M13a explaining an application operation environment and urging the connection of the AV amplifier 300 is displayed when the AV amplifier 300 is not connected. Subsequent to the display of the screen M13a, a list M43 of external devices described below is displayed according to a given manipulation by the user.

Meanwhile, when the AV amplifier 300 has been connected, but a transition to the active mode and the display of the manipulation screen (manipulation screens M31 to M33 described below) are not yet executed, a screen M13b urging a use initiation of an application ("audio device control application") is displayed. Subsequent to the display of the screen M13b, the transition to the active mode is performed according to a given manipulation by the user.

In FIG. 13, an example of a screen displayed according to the power-on determination result is shown. As shown in FIG. 13, a screen that is different according to the determination result is displayed in the application display area A22 shown in FIG. 11.

That is, when the AV amplifier is not powered on, a screen M21a for powering the AV amplifier 300 on is displayed. Subsequent to the display of the screen M21a, the AV amplifier 300 is powered on and the transition to the active mode is performed according to a given manipulation by the user.

On the other hand, when the AV amplifier has been powered on, a screen M21b with information indicating the status of the AV amplifier 300 is displayed. In the example shown in FIG. 13, an indication that the sound source and the sound field of the system 100 are set to "television receiver 200" and "standard," respectively, is displayed on the screen M21b. Subsequent to the display of the screen M21b, the transition to the active mode is performed according to a given manipulation by the user.

In FIG. 13, as a variant example of the screen M21b, a screen M21b" is shown. In the example shown in the screen M21b", an indication that the sound source and the sound field of the system 100 are set to "BD (Blu-ray disc player)" and "sports," respectively, and the AV amplifier 300 is powered on is shown.

In FIG. 14, the manipulation screen displayed with the transition to the active mode is shown. As shown in FIG. 14, any of manipulation screens M31, M32 and M33 for performing input switching, sound field switching, and sound quality setting is displayed in the application display area A2 shown in FIG. 11. Further, the user can select any of the manipulation screens M31, M32 and M33 by selecting a tab T on the screen. Further, the user can move a cursor C by manipulating the up, down, left and right buttons.

On the manipulation screen M31, the user can switch a source device that is the sound source of the system 100. On the manipulation screen M31, a list of selectable source devices is displayed, and an image of the selected source device is displayed. In the example shown in FIG. 14, the source device is set to "television receiver," as shown in the manipulation screen M31. Further, a manipulation menu OM for powering the AV amplifier 300 off or returning to a previous screen is displayed on the manipulation screen M31.

On the manipulation screen M32, the user can switch the sound field of the system 100. On the manipulation screen M32, a list of selectable sound fields is displayed and an image of the selected sound field is displayed. In the example shown in FIG. 14, a state in which the sound field is switched from "standard" to "music" is shown on the manipulation screen M32.

On the manipulation screen M33, the user can switch the sound quality of the system 100. On the manipulation screen M33, a list of setting items that can be set is displayed and an explanation of a selected setting item is displayed. In the example shown in FIG. 14, a center level, a subwoofer level, and a treble level are displayed on the manipulation screen M33, and a state in which the setting of the center level is performed is shown.

Figure 15:
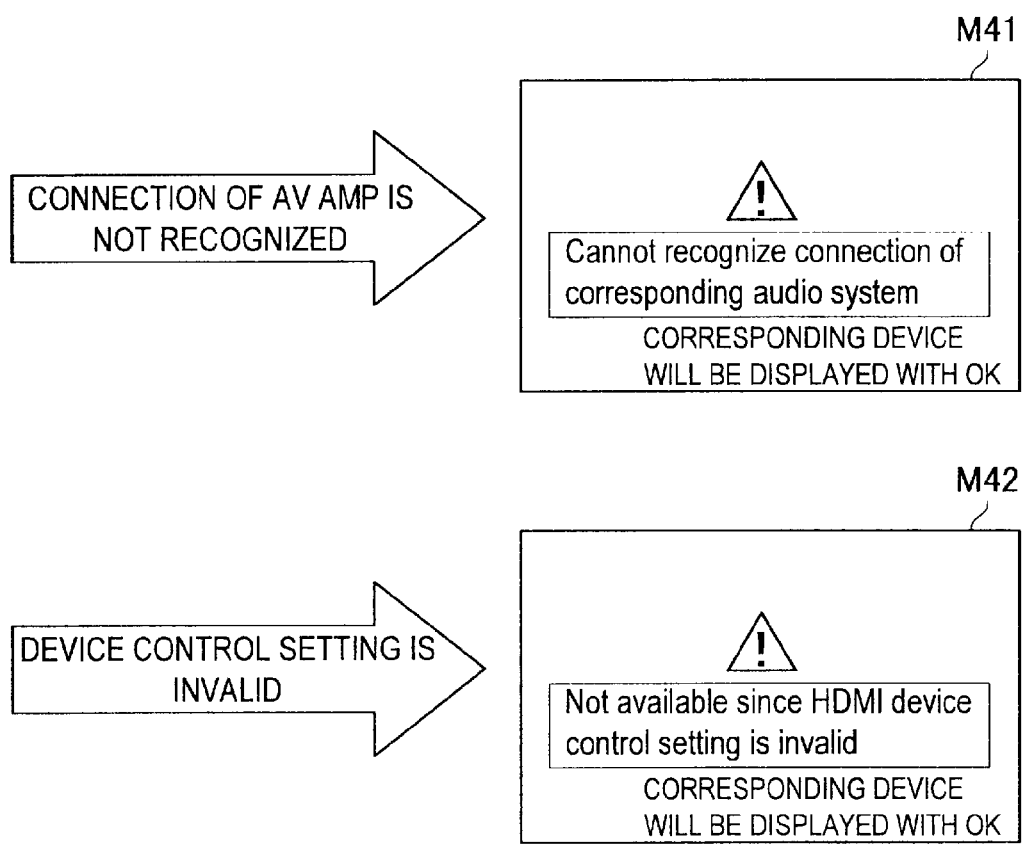
FIG. 15 shows a screen displayed when an error is generated.
Figure 16:
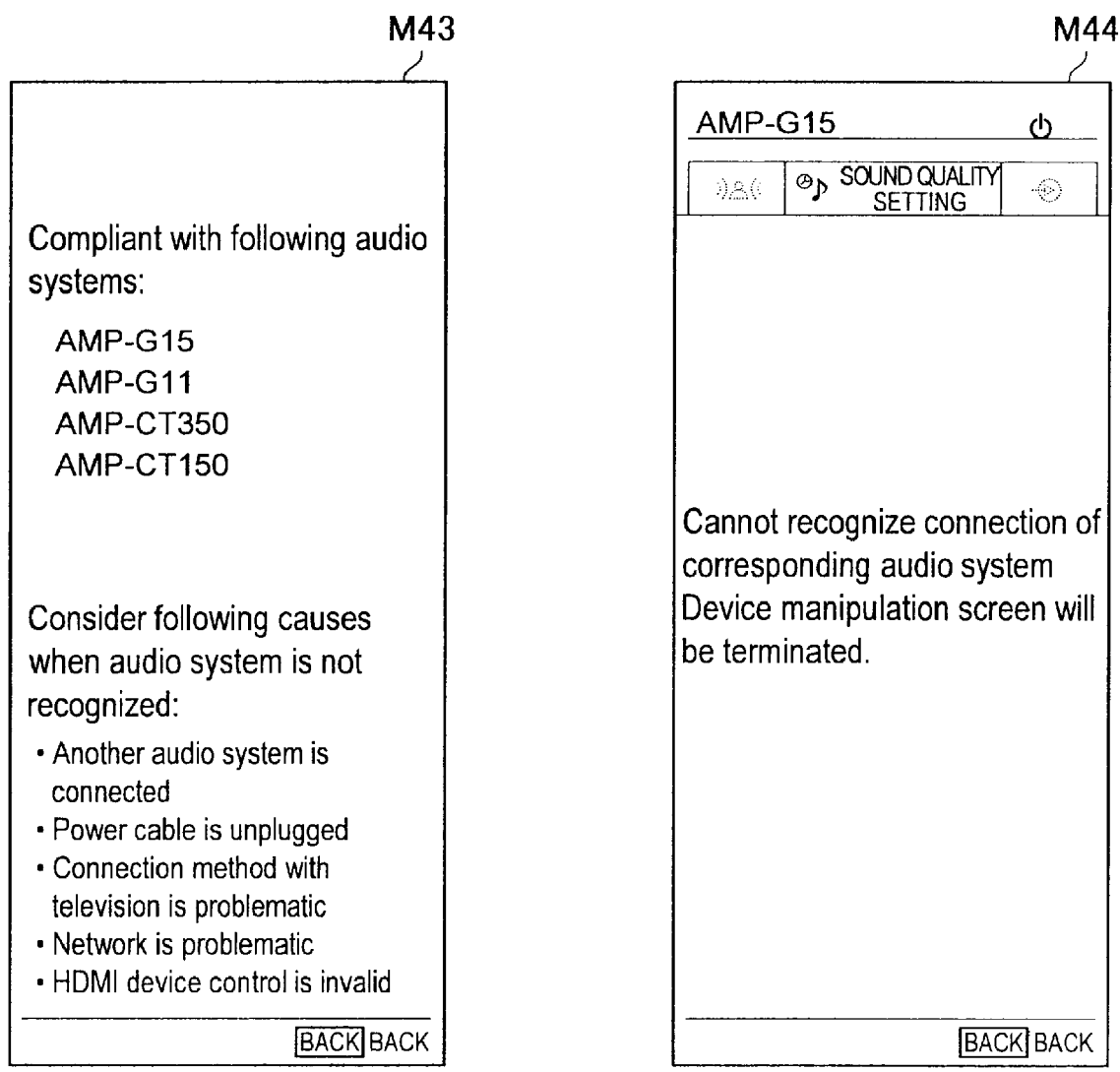
FIG. 16 shows a screen displayed when an error is generated.

In FIGS. 15 and 16, screens displayed when an error is generated are shown. Here, "when an error is generated" refers to a case in which information for displaying, for example, the screen displayed according to the power-on determination result shown in FIG. 13 may not be acquired. If the connection of the AV amplifier 300 is not recognized after being recognized, a screen M41 indicating that the connection of the AV amplifier 300 may not be recognized is displayed in the application display area A22 shown in FIG. 11. When the setting of the device control through the HDMI cable 701 is invalid, a screen M42 indicating that the device control setting is invalid is displayed. An external device list M43 described below is displayed according to a given manipulation by the user subsequent to the display of the screen M41 or the screen M42.

When a given manipulation by the user is performed in a state in which the AV amplifier 300 is not connected in the normal mode, a screen M43 showing a list of external devices corresponding to the application and explaining a coping method is displayed in the application display area A2. Further, when the connection of the AV amplifier 300 is not recognized in the active mode, a screen M44 notifying of a transition from the active mode to the normal mode is displayed, and the transition to the normal mode is executed after a given time elapses.

Here, the recognition of the connection of the AV amplifier 300 is performed by periodically transmitting a polling message from the television receiver 200 to an external device, including the AV amplifier 300, and confirming an ACK response received from the external device. Further, the recognition of device control setting is performed using setting information set, for example in a given register.

Figure 17:
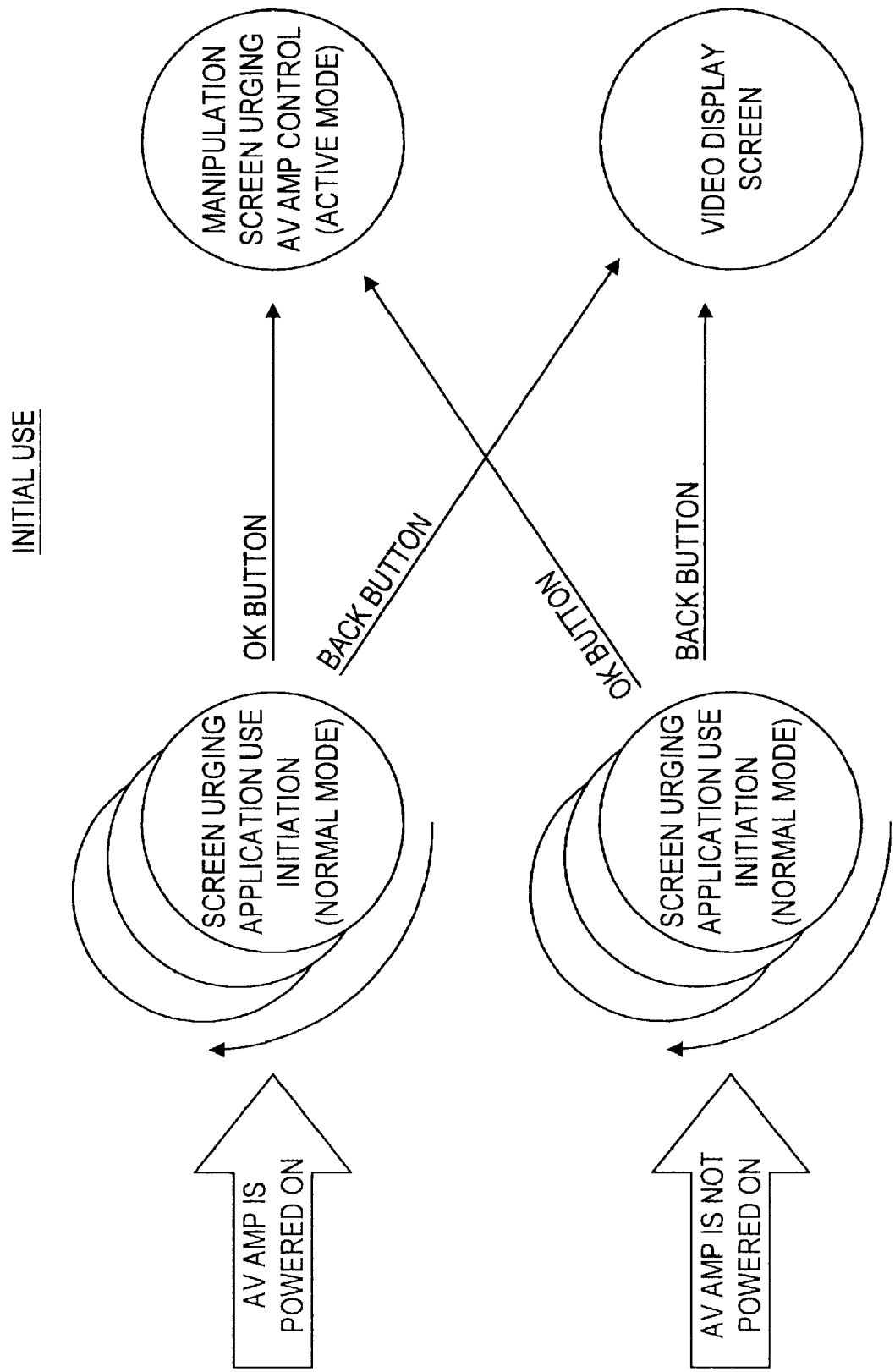
FIG. 17 shows a screen transition in an initial use after application registration.

In FIG. 17, a screen transition in an initial use, i.e., when the active mode is not executed after the application registration, is shown. Hereinafter, it is assumed that the connection of the AV amplifier 300 has been secured. It is also assumed that a back button, a power button, and a blue button are provided on the remote control shown in FIG. 4 as well as the OK button.

As shown in FIG. 17, switching of a series of screens M11, M12 and M13b urging application use initiation irrespective of a power status of the AV amplifier 300 is displayed. The screen transitions to the manipulation screen in the active mode according to the manipulation of the OK button, and the display in the application display area A2 stops according to the manipulation of the back button and the screen transitions to a video display screen that displays video information on the entire display panel 216 as shown in the state ST1 of FIG. 11.

Figure 18:
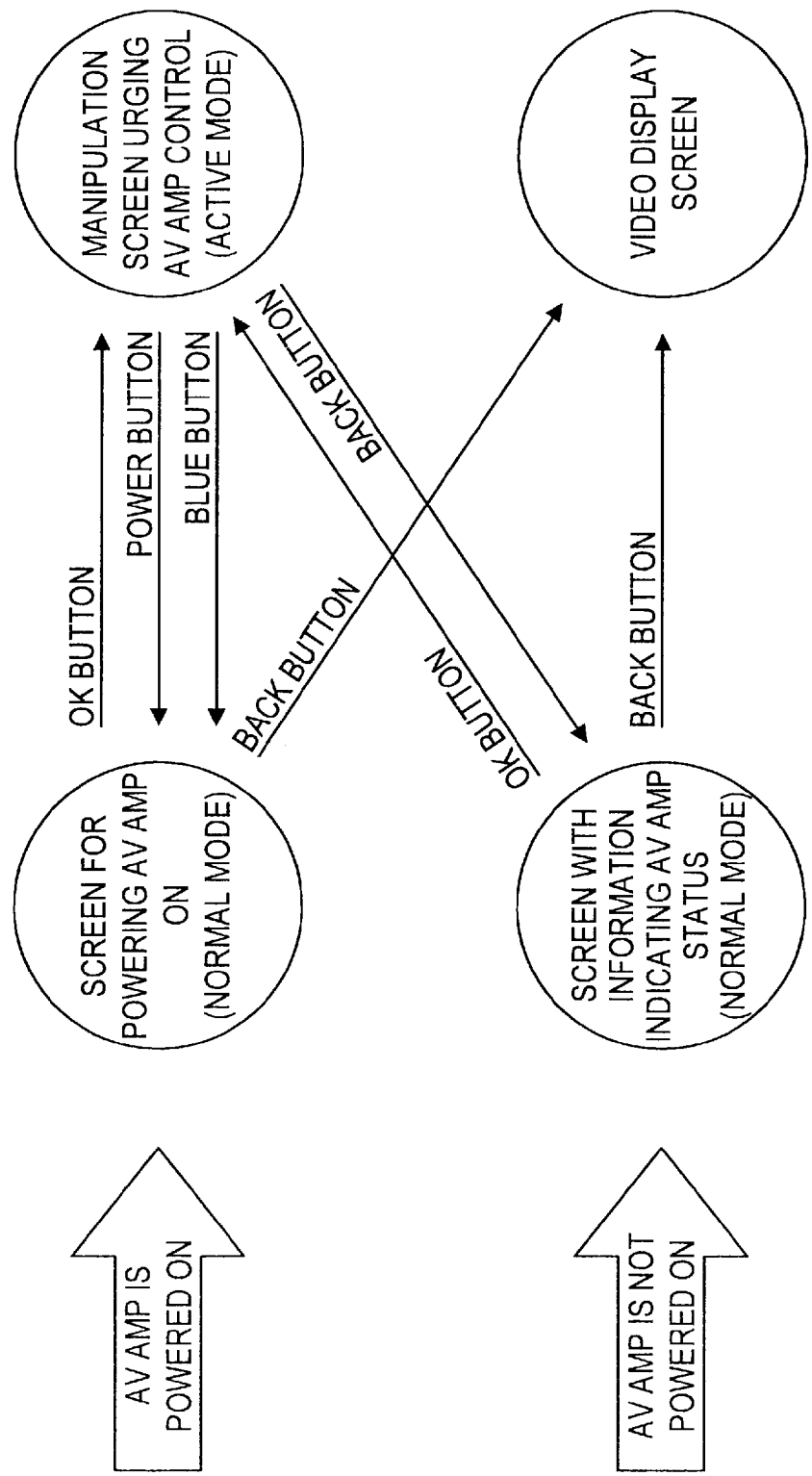
FIG. 18 shows a screen transition in uses other than an initial use after application registration.

In FIG. 18, a screen transition in uses other than the initial use, i.e., when the active mode has been executed after the application registration, is shown. As shown in FIG. 18, in a state in which the AV amplifier 300 has been powered on, a screen M21a for powering the AV amplifier 300 on is displayed, and in a state in which the AV amplifier 200 has not been powered on, a screen M21b with information indicating the status of the AV amplifier 300 is displayed.

In a state in which the AV amplifier 300 has not been powered on, the AV amplifier 300 is powered on according to the manipulation of the OK button, the screen transitions to the manipulation screen in the active mode, and the screen transitions to the video display screen in the normal mode according to the manipulation of the back button. On the other hand, in a state in which the AV amplifier 300 has been powered on, the screen transitions to the manipulation screen in the active mode according to the manipulation of the OK button, and the screen transitions to the video display screen in the normal mode according to the manipulation of the Back button. Further, in a state in which the manipulation screen is displayed, the screen transitions to the screen M21a according to the manipulation of the power button or the blue button, and the screen transitions to the screen M21b according to the manipulation of the back button.

As described above, according to the startup menu display process in the present embodiment, the status of an external device such as the AV amplifier 300 and the application usage status are determined upon the startup of the application, a screen according to the determination result is displayed in order to arrange an application operation environment, and then the manipulation screen for controlling the operation of the external device through the application is displayed. Accordingly, the user arranges the application operation environment according to the screen displayed according to the determination result and then performs user manipulation through the manipulation screen, thus easily initiating the control of the operation of the external device through the application.

Further, information displayed in an initial use of the application and in uses other than the initial use is changed. Accordingly, in the initial use, information explaining the application operation environment or information urging the user to use the application can be displayed, and in uses other than the initial use, the display of the information can be omitted and the manipulation screen can be displayed. For example, in the exhibition of dealers, normally, the application is initially used, and accordingly, a solicitation effect for, for example, sales promotion can be expected by displaying the information urging the user to use the application.

7. Automatic Application Acquisition Process [FIGS. 19 and 20]

Figure 19:
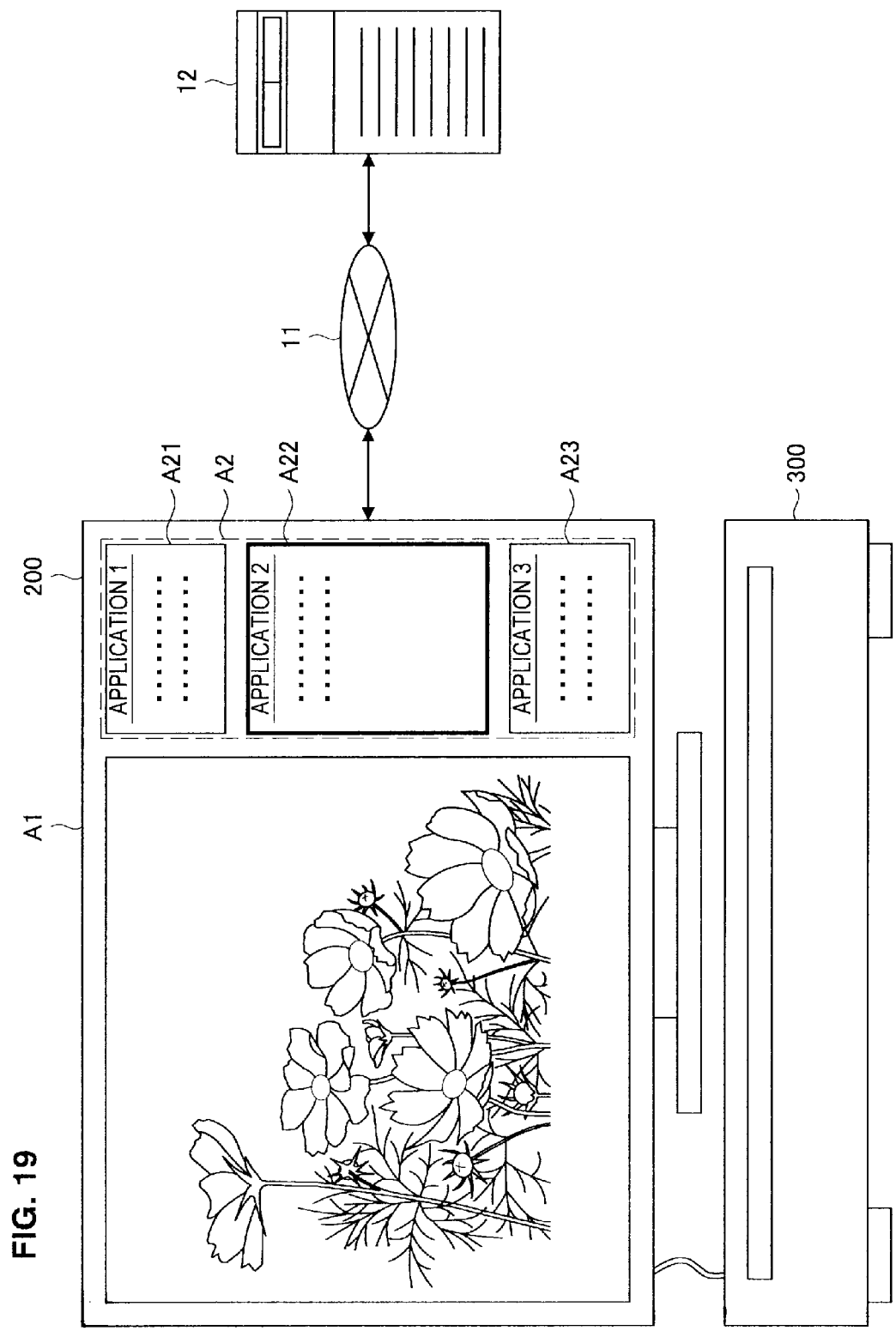
FIG. 19 shows an overview of an automatic application acquisition process according to an embodiment of the present invention.

In FIG. 19, an overview of an automatic application acquisition process according to an embodiment of the present invention is shown. As shown in FIG. 19, when an external device such as the AV amplifier 300 is connected to the television receiver 200 via the HDMI cable 701, a device control application (hereinafter, also referred to simply as an application) for controlling the external device is automatically acquired and registered from the application server 12 over the network 11. The automatically acquired application is focus displayed. In the example shown in FIG. 19, an application 2 displayed in the application display area A22 is automatically acquired and focus displayed.

In FIG. 20, a procedure of the automatic application acquisition process is shown. As shown, according to an embodiment of the present invention, first, the television receiver 200 determines whether a connection of an external device such as the AV amplifier 300 is newly recognized (step S201). When the connection of the external device is newly recognized, a device information request for the recognized external device is generated (S203). Here, the device information request refers to requesting the external device to transmit device information indicating a category, a model, an ID and the like of the external device. The device information request is transmitted to the external device (S205), and the device information is received from the external device in response to the device information request (S207).

When the device information is received, the television receiver 200 determines whether an application corresponding to the device information exists on the matching table (S209). When the application exists, a determination is made as to whether the application corresponding to the device information is not registered in an application list (S211). Here, the application list is a list indicating applications registered in the television receiver 200, and is managed by the television receiver 200. The matching table is a table indicating a correspondence relationship between the device information and the application, and is acquired from the application server 12 in advance.

The television receiver 200 determines whether the application corresponding to the device information is not a deleted application (S213). Here, the deleted application refers to an application that has been previously registered but deleted according to a user manipulation. In the television receiver 200, application deletion information is managed and automatic registration of the deleted application is inhibited. When the application has not been registered in the application list and the application is not the deleted application, the application list is updated by application registration (addition) (S215).

When the application determination is terminated, the television receiver 200 generates an application acquisition request based on the updated application list (S217). Here, information about an acquisition place of an application desired to be automatically acquired is included in the application acquisition request.

The application acquisition request is transmitted to the application server 12 (S219), and the application is received from the application server 12 according to the application acquisition request (S221). Here, a plurality of applications are managed in association with application acquisition places by the application server 12, and at least one application corresponding to the connected external device is selected based on the application acquisition request. When the application is received, the received application is focus displayed in the application display area A22 (S223).

As described above, according to the automatic application acquisition process in the present embodiment, an application for controlling an operation of the external device is automatically acquired from the application server 12 with a new connection of the external device. Accordingly, use of an application corresponding to the connected external device and managed by the application server 12 can be urged to the user. In particular, the user can easily initiate the control of the operation of the external device through the application by performing the above-described startup menu display process subsequent to the automatic application acquisition process.

Since the application corresponding to the connected external device is selectively automatically acquired, the user need not perform complicated manipulation, such as selection of applications one by one according to external devices. Further, since the automatic acquisition of a deleted application is inhibited, the user need not perform complicated manipulation such as re-deletion of the deleted application.

While the preferred embodiments of the present invention have been described in detail with reference to the accompanying drawings, the present invention is not limited to such embodiments. It should be understood by those skilled in the art that various modifications, combinations, sub-combinations and alterations may occur depending on design requirements and other factors insofar as they are within the scope of the appended claims or the equivalents thereof.

What is claimed is:

1. A device control apparatus comprising:
an application acquisition unit for acquiring an application for controlling an operation of an external device from an application server;
a display unit for displaying video information and a processing result based on the application;
a signal input/output unit for receiving a signal indicating a status of the external device and outputting a signal for controlling the external device;
a determination unit for determining the status of the external device and a usage status of the application upon startup of the application;
a display control unit for controlling the display unit to display a screen according to the result of the determination in order to arrange an operation environment of the application, and then display a manipulation screen for controlling the operation of the external device through the application;
an operation control unit for controlling the operation of the external device according to the user manipulation performed through the manipulation screen; and
an acquisition request generating unit for generating an application acquisition request including device information of the external device when the external device is newly connected,
wherein the application acquisition unit provides the application acquisition request to the application server, and automatically acquires the application for controlling the operation of the external device from the application server, the application being selected based on the device information by the application server.

2. The device control apparatus according to claim 1,
wherein the application acquisition unit automatically acquires, from the application server, an application for excluding a deleted application deleted based on a manipulation by the user after the application is registered in the apparatus.

3. A device control apparatus comprising:
an application acquisition unit for acquiring an application for controlling an operation of an external device from an application server;
a display unit for displaying video information and a processing result based on the application;
a signal input/output unit for receiving a signal indicating a status of the external device and outputting a signal for controlling the external device;
a determination unit for determining the status of the external device and a usage status of the application upon startup of the application;
a display control unit for controlling the display unit to display a screen according to the result of the determination in order to arrange an operation environment of the application, and then display a manipulation screen for controlling the operation of the external device through the application; and
an operation control unit for controlling the operation of the external device according to the user manipulation performed through the manipulation screen,
wherein the determination unit is capable of executing a connection determination to determine whether the external device corresponding to the application has been connected, an execution determination to determine whether a given process of displaying the manipulation screen has already been executed, and a power-on determination to determine whether the external device has been powered on, and
the display control unit controls the display unit to display a screen urging a user to connect the external device corresponding to the application when it is determined in the connection determination that the external device corresponding to the application has not been connected, a screen for executing the given process when it is determined in the execution determination after the connection determination that the given process has not been executed, a screen for powering the external device on when it is determined in the power-on determination after the execution determination that the external device has not been powered on, and the manipulation screen when the external device has been powered on.

4. The device control apparatus according to claim 3,
wherein the display control unit controls the display unit to display a list of external devices corresponding to the application when it is determined in the connection determination that the external device corresponding to the application has not been connected.

5. The device control apparatus according to claim 3,
wherein the display control unit controls the display unit to display a screen for displaying the manipulation screen when it is determined in the execution determination after the connection determination that the application is registered in the apparatus and then the manipulation screen has not been displayed.

6. The device control apparatus according to claim 3,
wherein the operation control unit outputs a signal for powering the external device on via the signal input/output unit when the screen for powering the external device on is displayed and then the given manipulation by a user is performed, and the display control unit controls the display unit to display the manipulation screen after the external device is powered on.

7. A device control method comprising:

acquiring an application for controlling an operation of an external device from an application server;

determining a status of the external device and a usage status of the application upon startup of the application;

displaying a screen according to the result of the determination in order to arrange an operation environment of the application, and then displaying a manipulation screen for controlling the operation of the external device through the application;

controlling the operation of the external device according to the user manipulation performed through the manipulation screen; and generating an application acquisition request including device information of the external device when the external device is newly connected, wherein the application acquisition request is provided to the application server, and the application for controlling the operation of the external device is automatically acquired from the application server, the application being selected based on the device information by the application server.

8. A computer-readable recording medium having stored thereon a program for causing a computer to execute a device control method comprising:

acquiring an application for controlling an operation of an external device from an application server;

determining a status of the external device and a usage status of the application upon startup of the application;

displaying a screen according to the result of the determination in order to arrange an operation environment of the application, and then displaying a manipulation screen for controlling the operation of the external device through the application;

controlling the operation of the external device according to the user manipulation performed through the manipulation screen; and generating an application acquisition request including device information of the external device when the external device is newly connected, wherein the application acquisition request is provided to the application server, and the application for controlling the operation of the external device is automatically acquired from the application server, the application being selected based on the device information by the application server.

\* \* \* \* \*